United States Patent
Takahashi et al.

(10) Patent No.: US 6,483,521 B1
(45) Date of Patent: Nov. 19, 2002

(54) IMAGE COMPOSITION METHOD, IMAGE COMPOSITION APPARATUS, AND DATA RECORDING MEDIA

(75) Inventors: Jun Takahashi, Katano (JP); Choong Seng Boon, Moriguchi (JP); Shinya Kadono, Kobe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/241,886

(22) Filed: Feb. 1, 1999

(30) Foreign Application Priority Data

Feb. 2, 1998 (JP) .......................................... 10-020586
Mar. 6, 1998 (JP) .......................................... 10-055245

(51) Int. Cl.$^7$ ................................................ G09G 5/00
(52) U.S. Cl. ...................................... 345/630; 345/582
(58) Field of Search ................................ 345/582, 586, 345/587, 611–613, 615, 629, 630, 634, 639, 640, 641

(56) References Cited

U.S. PATENT DOCUMENTS 5,594,850 A * 1/1997 Noyama et al. ............. 345/629
6,326,967 B1 * 12/2001 Inoue .......................... 345/427

FOREIGN PATENT DOCUMENTS

| EP | 0 527 586 A2 | 2/1993 |
| EP | 0 559 393 A1 | 9/1993 |
| EP | 0 676 723 A2 | 10/1995 |
| JP | 4-340671 | 11/1992 |

OTHER PUBLICATIONS

Knight S: "Real Time Visual Simulation Clues and Scene Anti–Aliasing", Computer Technology Review, US, Westworld Production Co. Los Angeles, vol. 10, No. 16, 1991, p. 108, 110, 112, 11 XP000204583, ISSN: 0278–9647, *p. 113, left–hand column, line 54—line 62*.

* cited by examiner

Primary Examiner—Matthew Luu
(74) Attorney, Agent, or Firm—Burr & Brown

(57) ABSTRACT

In an image composition method, a first image signal which forms a first image space including an object of an arbitrary shape and includes a shape signal indicating the shape of the object and a texture signal indicating the texture of the object, is composited with a second image signal which forms a second image space and includes a texture signal indicating the texture of the image, thereby generating a composite image signal which forms a third image space. This method comprises a composition ratio calculation step of calculating the composition ratio of the texture signal of a target pixel to be processed, by arithmetic on the shape signals of pixels positioned inside a target region in the first image space, the target region including the target pixel; and a pixel composition step of performing composition of the texture signals between the target pixel and a pixel included in the second image space and corresponding to the target pixel, based on the composition ratio calculated; wherein a composite texture signal obtained by the composition is used as the texture signal of a pixel included in the third image space and corresponding to the target pixel. Therefore, the image quality at the boundary of the object in the composite image is improved.

9 Claims, 25 Drawing Sheets

Fig.2 (a)
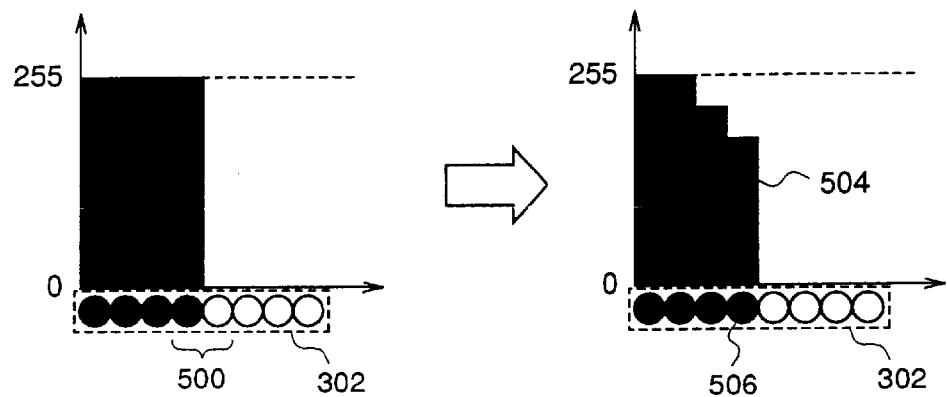
Fig.2 (b)
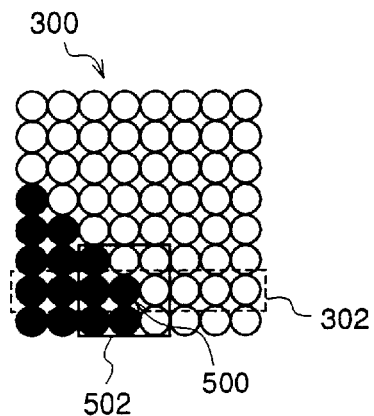
Fig.2 (c)
508
alpha = alpha_value × (count/range_count)
| | |
|---|---|
| alpha | : value of shape data after averaging |
| alpha_value | : value of shape data (255) |
| count | : number of pixels whose shape data are non-zero, in target region |
| range_count | : number of pixels in target region (9 for target region of 3 × 3 pixels) |

Fig.3 (a)

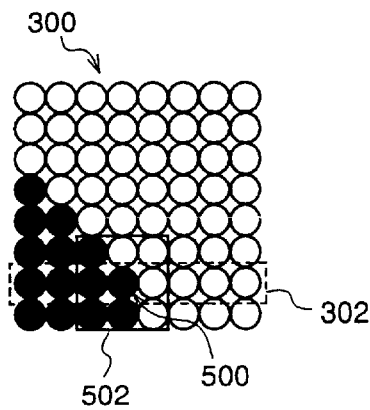

Fig.3 (b)

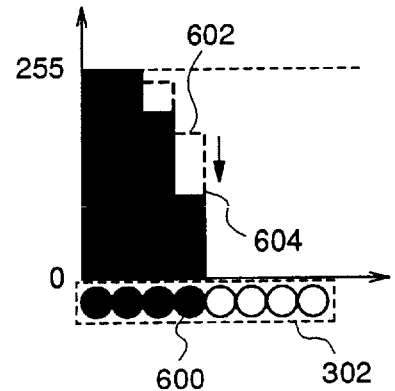

Fig.3 (c)

```
When count <= threshold,
alpha=0
If not,
alpha=alpha_value×(count-threshold)/(range_count-threshold)

alpha        : value of shape data after averaging
alpha_value  : value of shape data (255)
count        : number of pixels whose shape data are non-zero,
               in target region
threshold    : threshold (3 for target region of 3×3 pixels)
range_count  : number of pixels in target region
               (9 for target region of 3 × 3 pixels )
```

Fig.3 (d)

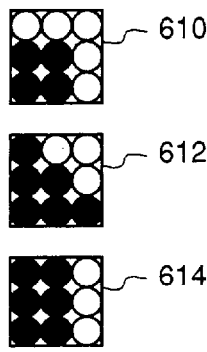

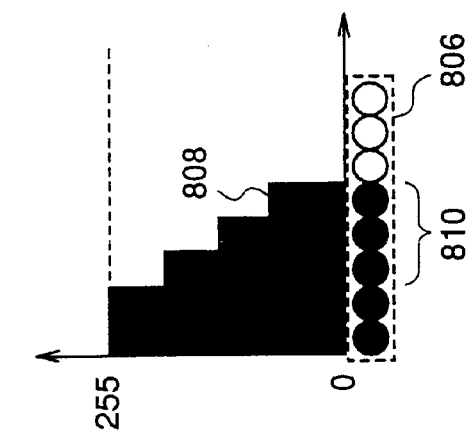
Fig.5 (a)
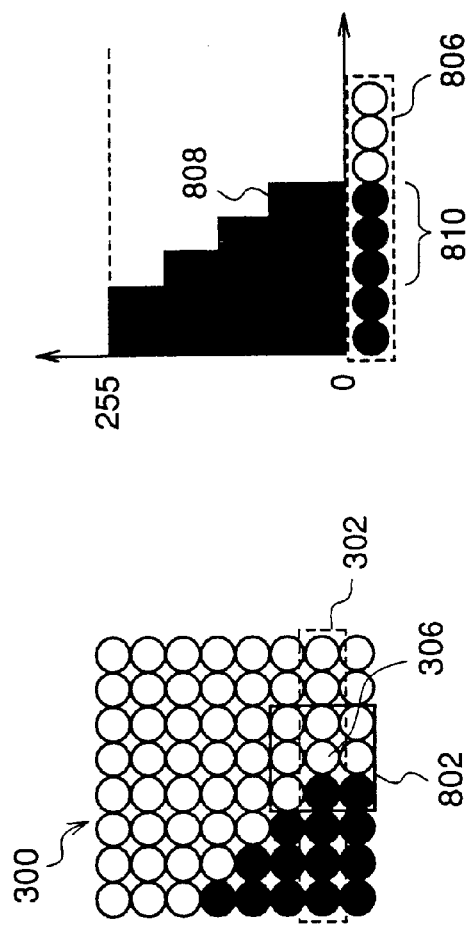
Fig.5 (b)
Fig.5 (c)
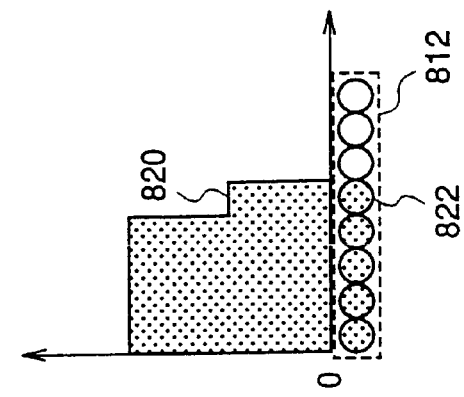
Fig.5 (d)
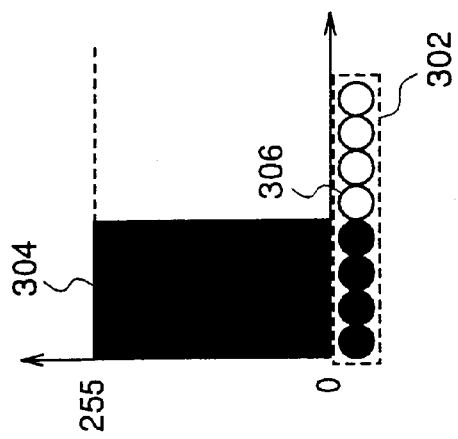
Fig.5 (e)

Fig.6

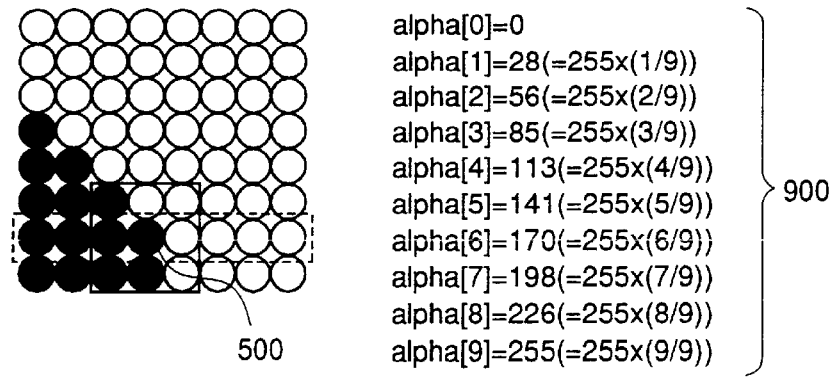

alpha[0]=0
alpha[1]=28(=255x(1/9))
alpha[2]=56(=255x(2/9))
alpha[3]=85(=255x(3/9))
alpha[4]=113(=255x(4/9))
alpha[5]=141(=255x(5/9))
alpha[6]=170(=255x(6/9))
alpha[7]=198(=255x(7/9))
alpha[8]=226(=255x(8/9))
alpha[9]=255(=255x(9/9))
⎫
⎬ 900
⎭

500 number of pixels whose shape data are non-zero
in target region =5
composition ratio of the corresponding pixel :
alpha[5]=255×5/9=141

Fig.7 pel=(alpha×fgpel+(MAX-alpha)×bgpel)/MAX
when using Table 1000,
pel=(table[fgpel][alpha]+table[bgpel][MAX-alpha])/MAX calculated by referring to Table    fixed value table[value of pixel][shape data]=composite texture data table[0][0]=0
.....
.....
table[100][200]=20000
table[101][200]=20200
table[102][200]=20400
table[103][200]=20600
table[104][200]=20800
table[105][200]=21000
table[106][200]=21200
table[107][200]=21400
table[108][200]=21600
table[109][200]=21800
table[110][200]=22000
table[111][200]=22200
.....
.....
table[255][255]=65025
⎫
⎬ 1000
⎭

Fig.8 table[value of pixel][number of shape data]=composite texture data table[0][0]=0
......
......
table[100][5]=500
table[101][5]=505
table[102][5]=510
table[103][5]=515
table[104][5]=520
table[105][5]=525
table[106][5]=530
table[107][5]=535
table[108][5]=540
table[109][5]=545
table[110][5]=550
table[111][5]=555
......
......
table[255][9]=2295

} 1100 pel=(alpha×fgpel+(MAX-alpha)×bgpel)/MAX

When using Table 1100, at MAX=255, MAX×bgpel=table[bgpel][9]
Accordingly, pel=(table[fgpel][count]+table[bgpel][9]-table[bgpel][count])/255   fixed value calculated by referring to Table 1100
(however, count : number of pixels
whose shape data are non-zero in
the predetermined region)

Fig.24 (a)
Fig.24 (b)
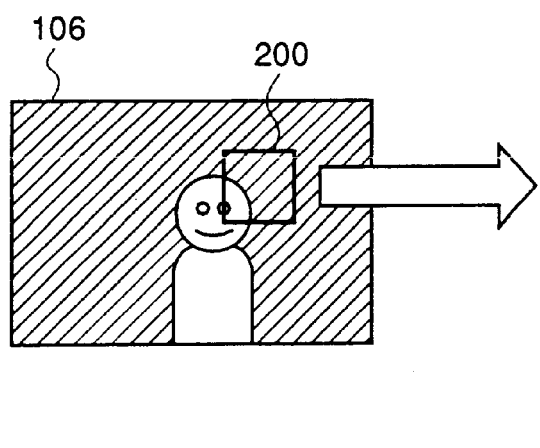
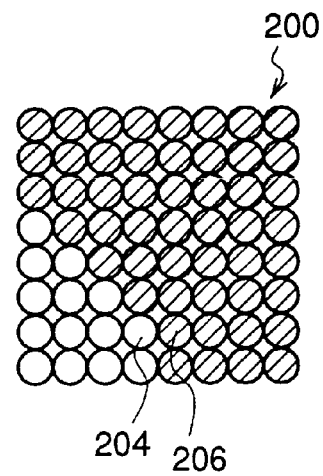
Prior Art
Fig.25 (a)
Fig.25 (b)
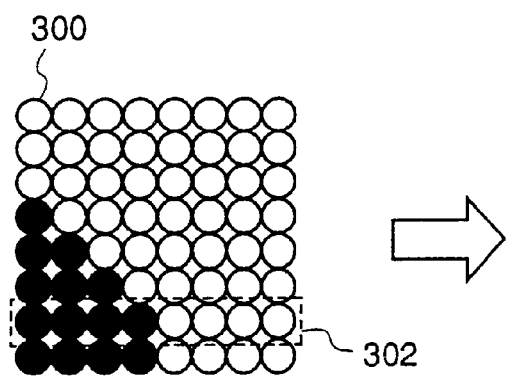
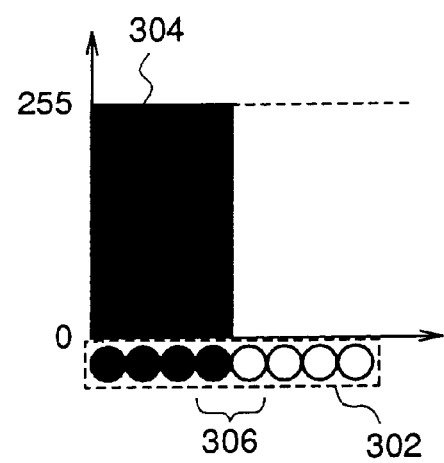

IMAGE COMPOSITION METHOD, IMAGE COMPOSITION APPARATUS, AND DATA RECORDING MEDIA

FIELD OF THE INVENTION

The present invention relates to image composition methods, image composition apparatuses, and data recording media and, more particularly, to a process of compositing an image having a shape with another image, and a recording medium which contains a program implementing the composition process by software.

BACKGROUND OF THE INVENTION

In recent years, we have greeted the age of multimedia in which audio, video and other data are integrally handled, and the conventional information media, i.e., means for transmitting information to men, such as newspapers, magazines, televisions, radios, and telephones, have been adopted as the objects of multimedia. Generally, "multimedia" means to represent, not only characters, but also diagrams, speeches, and especially images simultaneously in relation with each other. In order to handle the conventional information media as the objects of multimedia, it is necessary to transform the information of the media into a digital format.

When the data quantity of each information medium described above is estimated as a quantity of digital data, in case of characters, the data quantity for each character is 1~2 byte. However, in case of speech, the data quantity is 64 kbps (quality for telecommunication) and, in case of moving picture, it is more than 100 Mbps (quality for current television broadcasting). So, in the information media such as televisions, it is not practical to handle such massive data as it is in a digital format. For example, although visual telephones have already been put to practical use by ISDN (Integrated Services Digital Network) having a transmission rate of 64 kbps–1.5 Mbps, it is impossible to transmit an image of a television camera as it is by the ISDN.

So, data compression technologies are demanded. In case of visual telephones, a moving picture compression technology standardized as H.261 by (Tu-T (International Telecommunication Union-Telecommunication Sector) is employed. Further, according to a data compression technology of MPEG1, it is possible to record image data, together with audio data, in an ordinary music CD (compact disk).

MPEG (Moving Picture Experts Group) is an international standard of data compression for moving pictures. In MPEG1, data of a moving picture is compressed to 1.5 Mbps, i.e., data of a television signal is compressed to about ¹/₁₀₀. Since the transmission rate to which MPEG1 is directed is limited to about 1.5 Mbps, MPEG2 has been standardized to meet the demand for higher image quality. In MPEG2, data of a moving picture is compressed so that its transmission rate becomes 2~15 Mbps, to realize the quality for current television broadcasting.

Under the existing circumstances, standardization of MPEG4 is now proceeded by the working group for standardization of MPEG1 and MPEG2 (ISO/IEC JTC1/SC29/WG11). MPEG4 enables coding and handling of image information in object units, and thereby realizes new functions required in the age of multimedia.

One feature of MPEG4 is that a plurality of image signals for displaying different objects, for example, a foreground image (object) 102 and a background image (object) 100 shown in FIG. 23, are coded separately.

An image signal corresponding to each object is composed of a shape signal expressing the shape of the object, and a texture signal expressing the texture of the object. When coding the image signal, the shape signal and the texture signal are coded by different coding methods.

The texture signal is composed of a luminance signal indicating the brightness of the image of the object, and a chrominance signal indicating the color of the image of the object. The resolution of the chrominance signal is different from that of the luminance signal. To be specific, the size of one pixel as one of components of an image space obtained from the luminance signal (the area of one pixel on the display screen) is ¼ of the size of one pixel in an image space obtained from the chrominance signal. The luminance signal (chrominance signal) is composed of pixel values corresponding to the respective pixels in the image space.

The resolution of the shape signal is equal to the resolution of the luminance signal. To be specific, the size of one pixel as one of components of an image space obtained from the shape signal is equal to the size of one pixel as one of components of an image space obtained from the luminance signal. The shape signal is composed of pixel values corresponding to the respective pixels in the image space.

Accordingly, the luminance signal and the shape signal corresponding to a region enclosing one object on the screen (hereinafter, referred to as an object region) have the same number of pixel values.

In the following description, the image spaces obtained from the luminance signal, the chrominance signal, and the shape signal are referred to as a luminance space, a chrominance space, and a shape space, respectively; the pixels as components of the luminance space, the chrominance space, and the shape space are referred to as luminance pixels, chrominance pixels, and shape pixels, respectively; and the pixel values of the luminance pixels, the chrominance pixels, and the shape pixels are referred to as luminance data, chrominance data, and shape data, respectively. Further, a shape space, a luminance space, and a chrominance space obtained from an image signal (i.e., shape, luminance, and chrominance signals) corresponding to one object are equal in the reference position and the size.

When the pixel values of the shape signal are represented by either "0" or "non-0", shape pixel whose pixel values is "0" is positioned outside the image of the object in the shape space, while a shape pixel whose pixel value is "non-0" is positioned inside the image of the object in the shape space.

On the other hand, decoding is performed as follows. As shown in FIG. 23, coded data (coded texture signal and coded shape signal) corresponding to the respective objects (foreground image and background image) are decoded, and the texture signals of the foreground image 100 and the background image 102 are composited by using the decoded shape signal to reproduce a composite image 106. The FIG. 23, reference numeral 104 designates the shape of the object obtained from the shape signal. In this composition of texture signals, composition of luminance signals and composition of chrominance signals are carried out.

By the way, since the resolution of the chrominance signal is ¼ of the resolution of the luminance signal or the shape signal as described above, the decoded shape signal (hereinafter also referred to as an unconverted shape signal) cannot be used as it is for the composition of chrominance signals. So, the resolution of the shape signal must be converted to generate a shape signal adapted to the resolution of the chrominance signal (hereinafter also referred to as a converted shape signal).

As a method for converting the resolution of the shape signal, MPEG4 employs a method described in "MPEG4 Video Verification Model Ver8.0 (ISO/IEC JTC1/SC29/WG11 N1/96, pp. 17).

Since the resolution of the chrominance signal is ¼ of the resolution of the shape signal as described above, one pixel in the chrominance space corresponds to four pixels in the image space obtained from the uncovered shape signal. Further, since the resolution of the decoded shape signal is adapted to the resolution of the chrominance signal, one pixel in the chrominance space corresponds to one pixel in the image space obtained from the converted shape signal.

So, in the above-described resolution conversion method, when one of the four shape pixels corresponding to one chrominance pixel has the pixel value which is not "0", in other words, when a shape pixel whose pixel value is "non-0" exists in the four shape pixels corresponding to one chrominance pixel, one shape pixel corresponding to the chrominance pixel in the image space obtained from the converted shape signal has the pixel value of "non-0".

Hereinafter, the image composition method will be described in more detail with reference to FIG. 23.

Initially, a description is given of the case where the shape signal is a binary signal which takes "0" or "non-0" as its pixel value.

When the luminance signal of the foreground image 102 and the luminance signal of the background image 100 are composited by referring to the shape signal of the foreground image 102, with respect to the luminance pixels corresponding to the shape pixels whose pixel values are "non-0" (i.e., pixels positioned in the black portion in the shape space 104), the pixel values of the foreground image are used as pixel values of the composite pixels. On the other hand, with request to the luminance signals corresponding to the shape signals whose pixel value are "0" (i.e., pixels positions outside the black portion in the shape space 104), the pixel values of the background image are used as the pixel values of the composite pixels. Further, also the chrominance signals are subjected to similar composition by using the converted shaped signal.

Next, a description is given of the case where the shape signal is a multi-valued signal taking any of 0, 1, 2, 3, . . . , 255 as its pixel value.

When the luminance signal of the foreground image 102 and the luminance signal of the background image 100 are composited by referring to the shape signal of the foreground image 102, the luminance pixel in the composite image, which corresponds to the shape pixel whose pixel value is the minimum value of the multi-valued signal, has the pixel value of the background image as its pixel value, and the luminance pixel in the composite image, which corresponds to the shape signal whose pixel value is the maximum value of the multi-valued signal, has the pixel value of the foreground image as its pixel value.

Furthermore, also the chrominance signals are subjected to similar composition. That is, the chrominance signal in the composite image, which corresponds to the shape pixel whose pixel value is the maximum value or the minimum value of the converted shape signal after the resolution conversion, has the pixel value of the foreground image or the background image as its pixel value. In this case, the average of the pixel values of the four shape pixels corresponding to one chrominance pixel is calculated, and this average value is used as the pixel value of one shape pixel corresponding to the chrominance pixel on the image space obtained from the converted shape signal.

When the shape signal is the multi-valued signal, resolution conversion for this shape signal is different from that for the binary shape signal. That is, when the shape signal has, as its pixel value, an intermediate value between the maximum value and the minimum value of the multi-valued signal, the pixel value of the composite pixel is obtained by calculating the weighted average of the pixel values of the texture signals (luminance signals and chrominance signals) between the foreground image and the background image, by using the shape data (pixel value of the shape signal) as the weighting factor. Thereby, the background image is displayed through the foreground image.

An example of an arithmetic expression for the weighted averaging is as follows.

$$pel = (alpha \times fgpel + (MAX - alpha) \times bgpel)/MAX \quad (1)$$

wherein pel is the pixel value after composition, alpha is the composition ratio to the pixel value of the foreground image (shape data), fgpel is the pixel value of the foreground image (luminance data or chrominance data), bgpel is the pixel value of the background image (luminance data or chrominance data), and MAX is the maximum value of the shape signal.

When alpha has a value in a range from 0 to 255, MAX is 255. Although the calculation to obtain the weighted average by formula (1) includes rounding of the result of the calculation, the decimal part of the result may be rounded down.

Further, in the calculation to obtain the weighted average, the pixel value (luminance data or chrominance data) of the foreground image may be previously multiplied by the pixel value (shape data) of the corresponding shape signal, to delete the multiplication in formula (1). In this case, formula (1) is reduced to.

$$pel\text{-}fgpel' + (1 - alpha') \times bgpel \quad (2)$$

wherein alpha' is the composition ratio to the pixel value of the foreground image (shape data), and fgpel' is the pixel value of the foreground image, multiplied by alpha' (luminance data or chrominance data).

In formula (2), alpha' takes a value in a range from 0/255 to 255/255.

When fgpel'-fgpel×alpha' in formula (2), the same respect as in the case of MAX=1 in fomula (1) is obtained.

When performing composition of a foreground image and a background image by using a binary shape signal, however, if the pixel values (luminance data or chrominance data) of pixels at the boundary of the foreground image and the background image in the composite image are far apart from each other, the boundary appears unnatural.

This problem will be described in more detail by using FIG. 24.

FIG. 24(*a*) shows a composite image 106 obtained by compositing a foreground image and a background image. FIG. 24(*b*) shows an enlarged portion (pixels) 200 of the composite image 106, which portion has a predetermined size (8×8 pixels) and includes the boundary of the foreground image and the background image.

As shown in FIG. 24(*b*), at the boundary of the foreground image and the background image in the composite image 106, for example, between a pixel 204 and a pixel 206, if the pixel values of these pixels are far apart from each other, the boundary sometimes appears unnatural.

FIG. 25(*a*) shows a portion (pixels) 300 of an image obtained from the shape signal of the foreground image, which portion corresponds to the portion 200 in the composite image 106. FIG. 25(b) shows the pixel values (shape data) of pixels included in one line 302 of pixels in the portion 300, on a coordinate plane in which the abscissa shows the pixel position and the ordinate shows the value of the shape data. The shape data of each pixel takes a value in a range from 0 to 255.

When the pixel values of the foreground pixel and the background pixel corresponding to the shape pixel are composited according to the shape signal, the pixel value (composite data) corresponding to each pixel (composite pixel) as a component of the composite image is obtained. At this time, the composite pixel corresponding to the shape pixel whose pixel value is not 0 has, as its pixel value, the pixel value of the corresponding foreground pixel or the pixel value obtained by weighted averaging of the pixel values of the foreground and background pixels. On the other hand, the composite pixel corresponding to the shape pixel whose pixel value is 0 has, as its pixel value, the pixel value of the corresponding background pixel.

When the foreground pixel and the background pixel have discontinuous pixel values at the boundary 306, for example, when the pixel value (luminance data or chrominance data) of the foreground pixel and the pixel value (luminance data or chrominance data) of the background pixel are considerably different from each other at the boundary 306, the foreground image and the background image appear unnatural at the boundary, on the display of the composite image.

Accordingly, it is necessary to process the pixel values of the pixels at the boundary or the composition ratio used for composition so that the boundary of objects in the composite image appears natural.

Moreover, in the case where the shape signal and the texture signal have different resolutions as described above, when the texture signals of the foreground image and the background image are composited by using the shape signal or the composite image obtained by the composition of the texture signals is converted to a desired screen size (resolution), the image quality is degraded.

A description is now given of such degradation of image quality, with reference to FIGS. 26 and 27.

FIG. 26 is a diagram for conceptually explaining the process of compositing a foreground image and a background image, each comprising the pixel values of 2×2 pixels, by using a shape signal comprising the pixel values of 4×4 pixels. FIG. 27 is a block diagram illustrating the structure for performing the composition process and resolution conversion of the texture signal of the composite image obtained by the composition.

In FIG. 27, the shape signal 2500 of the foreground image is applied to the first input terminal 2600, and the chrominance signals 2504 and 2506 of the foreground image and the background image are applied to the second and third input terminals 2602 and 2604, respectively.

In the image format used in MPEG4, since the resolution of the chrominance signal is ¼ of the resolution of the luminance signal or the shape signal, the shape signal 2500 is subjected to resolution conversion by the resolution conversion unit 2606 so as to have the same resolution as the chrominance signal.

Next, using the shape signal 2502 whose resolution has been converted, the chrominance signal 2504 of the foreground image and the chrominance signal 2506 of the background image are composited by the image composition units 2608. Since the resolution of the composite chrominance signal 2508 is different from the resolution of the luminance signal as described above, the composite chrominance signal 2508 is subjected to resolution conversion by the resolution conversion means 2610 so as to have the same resolution as the corresponding luminance signal when it is displayed, and the composite chrominance signal 2510 after the resolution conversion is output from the output terminal 2602.

Usually, the pixel values added by the resolution conversion are pixel values obtained by calculation based on the pixel values of pixels adjacent to the pixels having the added pixel values. When the pixel values in the composite chrominance signal 2510 which has been subjected to resolution conversion are compared with the pixel values of the pixels outside the object (black portion) in the shape signal 2500 before the resolution conversion, it is found that, in the composite chrominance signal 2510, some pixels outside the object have the same pixel value as the pixels inside the object.

As the result, the image displayed based on the chrominance signal is blurred.

Also when processing (composition and resolution conversion) the luminance signal, for the same reason as described above, the quality of reproduced image is degraded at the boundary.

SUMMARY OF THE INVENTION

The present invention is made to solve the above-described problems and has for its object to provide an image composition apparatus and an image composition method which are able to improve the image quality at the boundary of objects in the composite image, and a data recording medium which contains a program implementation an image composition process by the image composition method by software.

Other objects and advantages of the invention will became apparent from the detailed description that follows. The detailed description and specific embodiment described are provided only for illustration since various additions and modifications within the scope of the invention will be apparent to those of skill in the art from the detailed description.

According to a first aspect of the present invention, there is provided an image composition method for compositing a first image signal which forms a first image space including an object of an arbitrary shape and includes a shape signal indicating the shape of the object, and a texture signal indicating the texture of the object, and a second image signal which forms a second image space and includes a texture signal indicating the texture of the image, thereby generating a composite image signal which forms a third image space, and this method comprises: composition ratio calculation step of calculating the composition ratio of the texture signal of a target pixel to be processed, by arithmetic on the shape signals of pixels positioned inside a target region in the first image space, the target region including the target pixel; and pixel composition step of performing composition of the texture signals between the target pixel and a pixel included in the second image space and corresponding to the target pixel, based on the composition ratio calculated; wherein a composition texture signal obtained by the composition is used as the texture signal of a pixel included in the third image space and corresponding to the target pixel.

According to a second aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: shape decision step of deciding whether each pixel is positioned inside the object or not, based on the shape signal of each pixel in the first image space; composition ratio calculation step of calculating the composition ratio of the texture signal of the target pixel, based on the number of pixels positioned inside the object in a target region including the target pixel, when the result of the decision is that the target pixel is positioned inside the object; and pixel composition step of performing composition of the texture signals of the target pixel and a pixel included in the second image space and corresponding to the target pixel, based on the composition ratio calculated; wherein a composite texture signal obtained by the composition is used as the texture signal of a pixel included in the third image space and corresponding to the target pixel.

According to a third aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms at third image space, and this method comprises: shape decision step of deciding, based on the shape signal of each pixel in the first image space, as to whether the pixel is positioned inside the object or not; composition ratio calculation step of calculating the composition ratio of the texture signal of a target pixel to be processed, based on the shape signals of pixels positioned inside a target region in the first image space, the target region including the target pixel; pixel data generation step of replacing the texture signal of the target pixel with a texture signal obtained by calculating the average of the texture signals of the pixels in the target region, when the result of the decision is that the target pixel is positioned outside the object; and pixel composition step of performing composition of the texture signals between the target pixel and a pixel included in the second image space and corresponding to the target pixel, based on the composition ratio calculated; wherein a composite texture signal obtained by the composition is used as the texture signal of a pixel included in the third image space and corresponding to the target pixel.

According to a fourth aspect of the present invention, there is provided an image composition method for compositing a first decoded image signal which forms a first image space including an object of an arbitrary shape and includes a shape signal indicating the shape of the object and a texture signal indicating the texture of the object, and a second decoded image signal which forms a second image space and includes a texture signal indicating the texture of the image, thereby generating a composite image signal which forms a third image space, and this method comprises: composition ratio calculation step of calculating the composition ratio of the texture signal of a target pixel to be processed, by arithmetic on the shape signals of pixels positioned inside a target region in the first image space, the target region including the target pixel; and pixel composition step of performing composition of the texture signals between the target pixel and a pixel included in the second image space and corresponding to the target pixel, based on the composition ratio calculated; wherein, in the pixel composition step, a texture signal composition method to be used for the composition step is selected by referring to additional information which has previously been added to a coded image signal corresponding to the first decoded image signal.

According to a fifth aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: boundary detection step of detecting the boundary of the object, based on the shape signal of each pixel in the first image space; composition ratio calculation step of calculating the composition ratio of the texture signal of a target pixel to be processed, based on the shape signals of pixels positioned inside a target region including the target pixel in the first image space, the calculation being performed on only pixels which are positioned inside the outside the object, in the vicinity of the boundary of the object; and pixel composition step of performing, for the pixels in the vicinity of the boundary of the object, composition of the texture signals between the target pixel and a pixel included in the second image space and corresponding to the target pixel, based on the composition ratio calculated, and performing, for the pixels other than those in the vicinity of the boundary, composition of the texture signals between the target pixel and a pixel included in the second image space and corresponding to the target pixel, based on the shape signals of these pixels; wherein a composite texture signal obtained by the composition is used as the texture signal of a pixel included in the third image space and corresponding to the target pixel.

According to a sixth aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: pixel composition step of performing composition based on additional information indicating the size of the object and the position of the object in the first image space, wherein specific pixels in the first image space, which are positioned inside or outside the object and in the vicinity of the boundary of the object, are subjected to composition of texture signals between target pixels in the first image space and the corresponding pixels in the second image space; and for the other pixels in the first image space, the texture signals of the corresponding pixels in the second image space are used as the texture signals of the corresponding pixels in the third image space; wherein, as the texture signals of pixels in the third image space and corresponding to the specific pixels, the texture signals obtained by composition in the pixel composition step are used.

According to a seventh aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: resolution conversion step wherein, when the texture signal and the shape signal, composing the first image signal, have different resolutions, the texture signal is subjected to resolution conversion such that its resolution is made equal to the resolution of the shape signal; and image composition step of performing composition of the first image signal and the second image signal by using the resolution-converted texture signal and the shape signal.

According to an eighth aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: resolution conversion step wherein, when the resolution of the texture signal composing the first image signal, the resolution of the texture signal composing the second image signal, and the display resolution when displaying the texture signal composing the composite image signal are different from each other, the texture signals of the first and second image signals are subjected to resolution conversion such that their resolutions are made equal to the display resolution; and image composition step of performing composition of the first image signal and the second image signal by using the resolution converted texture signals of the first and second image signal.

According to a ninth aspect of the present invention, there is provided an image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this method comprises: a first image composition process comprising: a composition ratio calculation step of calculating the composition ratio of the texture signal of a target pixel, according to the shape signals of pixels positioned inside a target region including the target pixel in the first image space; and a pixel composition step of performing composition of texture signals between the target pixel and a pixel included in the second image space and corresponding to the target pixel, according to the composition ratio calculated; wherein a composite texture signal obtained by the composition is used as the texture signal of a pixel included in the third image space and corresponding to the target pixel; and a second image composition process comprising a pixel composition step of performing composition of texture signals between the target pixel in the first image space and the corresponding pixel in the second image space, with a composition ratio different from the composition ratio used in the first image composition process, wherein a composite texture signal obtained by the composition is used as the texture signal of a pixel included in the third image space and corresponding to the target pixel; wherein the first and second image composition processes are switched according to the shape signals of pixels positioned inside the target region in the first image space.

According to a tenth aspect of the present invention, there is provided an image composition apparatus for compositing a first decoded image signal which forms a first image space including an object of an arbitrary shape and includes a shape signal indicating the shape of the object and a texture signal indicating the texture of the object, and a second decoded image signal which forms a second image space and includes a texture signal indicating the texture of the image, thereby generating a composite image signal which forms a third image space, and this apparatus comprises: composition ratio calculation means for calculating the composition ratio of the texture signal of a target pixel to be processed, by arithmetic on the shape signals of pixels positioned inside a target region in the first image space, the target region including the target pixel; and pixel composition means for performing composition of the texture signals between the target pixel and a pixel included in the second image space and corresponding to the target pixel, based on the composition ratio calculated; wherein a texture signal composition method to be used by the composition means is selected by referring to additional information which has previously been added to a coded image signal corresponding to the first decoded image signal.

According to an eleventh aspect of the present invention, there is provided an image composition apparatus for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this apparatus comprises: boundary detection means for detecting the boundary of the object, based on the shape signal of each pixel in the first image spacer; composition ratio calculation means for calculating the composition ratio of the texture signal of a target pixel to be processed, based on the shape signals of pixels positioned inside a target region including the target pixel in the first image space, the calculation being performed on only pixels which are positioned inside and outside the object, in the vicinity of the boundary of the object; and pixel composition means for performing, for the pixels in the vicinity of the boundary of the object, composition of the texture signals between the target pixel and a pixel included in the second image space and corresponding to the target pixel, based on the composition ratio calculated, and performing, for the pixels other than those in the vicinity of the boundary, composition of the texture signals between the target pixel and a pixel included in the second image space and corresponding to the target pixel, based on the shape signals of these pixels; wherein a composite texture signal obtained by the composition is used as the texture signal of a pixel included in the third image space and corresponding to the target pixel.

According to a twelfth aspect of the present invention, there is provided an image composition apparatus for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this apparatus comprises: pixel composition means for performing composition based on additional information indicating the size of the object and the position of the object in the first image space, wherein specific pixels in the first image space, which are positioned inside or outside the object and in the vicinity of the boundary of the object, are subjected to composition of texture signals between target pixels in the first image space and the corresponding pixels in the second image space; and for the other pixels in the first image space, the texture signals of the corresponding pixels in the second image space are used as the texture signals of the corresponding pixels in the third image space; wherein, as the texture signals of pixels in the third image space and corresponding to the specific pixels, the texture signals obtained by composition in the pixel composition step are used.

According to a thirteenth aspect of the present invention, there is provided an image composition apparatus for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this apparatus comprises: resolution conversion means for subjecting the texture signal to resolution conversion such that the resolution of the texture signal is made equal to the resolution of the shape signal, when the texture signal and the shape signal, composing the first image signal, have different resolutions; and image composition means for performing composition of the first image signal and the second image signal by using the resolution-converted texture signal and the shape signal.

According to a fourteenth aspect of the present invention, there is provided an image composition apparatus for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this apparatus comprises: resolution conversion means for subjecting the texture signal composing the first image signal and the texture signal composing the second image signal to resolution conversion such that the resolutions of these texture signals are made equal to the display resolution when displaying the texture signal composing the composite image signal, when the resolutions of the texture signals and the display resolution are different from each other; and image composition means for performing composition of the first image signal and the second image signal by using the resolution-converted texture signals of the first and second image signal.

According to a fifteenth aspect of the present invention, there is provided an image composition apparatus for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, and this apparatus comprises: a first image composition unit comprising: composition ratio calculation means for calculating the composition ratio of the texture signal of a target pixel, according to the shape signals of pixels positioned inside a target region including the target pixel in the first image space; and pixel composition means for performing composition of texture signals between the target pixel and a pixel included in the second image space and corresponding to the target pixel, according to the composition ratio calculated; wherein a composite texture signal obtained by the composition is used as the texture signal of a pixel included in the third image space and corresponding to the target pixel; and a second image composition unit comprising pixel composition means for performing composition of texture signals between the target pixel in the first image space and the corresponding pixel in the second image space, with a composition ratio different from the composition ratio used in the first image composition process, wherein a composite texture signal obtained by the composition is used as the texture signal of a pixel included in the third image space and corresponding to the target pixel; wherein the first and second image composition units are switched according to the shape signals of pixels positioned inside the target region in the first image space.

According to a sixteenth aspect of the present invention, there is provided a data storage medium containing a program for making a computer perform an image composition process, the program being constructed so that the computer performs an image composition process according to any of the image composition methods described above.

BRIEF DESCRIPTION OF THE DRAWINGS

FIGS. 2(a)–2(c) are diagrams for conceptually explaining the image composition method of the first embodiment.

FIGS. 3(a)–3(d) are diagrams for conceptually explaining an image composition method according to a second embodiment of the present invention.

FIGS. 5(a)–(e) are diagrams for conceptually explaining the image composition method of the third embodiment.

FIG. 6 is a schematic diagram for explaining an image composition method according to a fourth embodiment of the present invention.

FIG. 7 is a diagram for explaining an image composition method according to a fifth embodiment of the present invention.

FIG. 8 is a diagram for explaining an image composition method according to a modification of the fifth embodiment.

FIGS. 24(a) and 24(b) are diagrams for explaining a composite image obtained by the image composition method of FIG. 23.

FIGS. 25(a) and 25(b) are diagrams illustrating shape data corresponding to the composite image shown in FIG. 24.

DETAILED DESCRIPTION OF THE PREFERRED EMBODIMENTS

Hereinafter, embodiments of the present invention will be described.

Embodiment 1

A first embodiment of the present invention relates to an image composition method in which image signals corresponding to images of different objects are composited by referring to shape signals corresponding to the respective images. In this method, shape data (pixel values of the shape signal) of pixels which are positioned inside and adjacent to the boundary of the image of each object are subjected to smoothing, followed by composition of the image signals of the objects, whereby the image quality of the composite image is improved.

Figure 1:
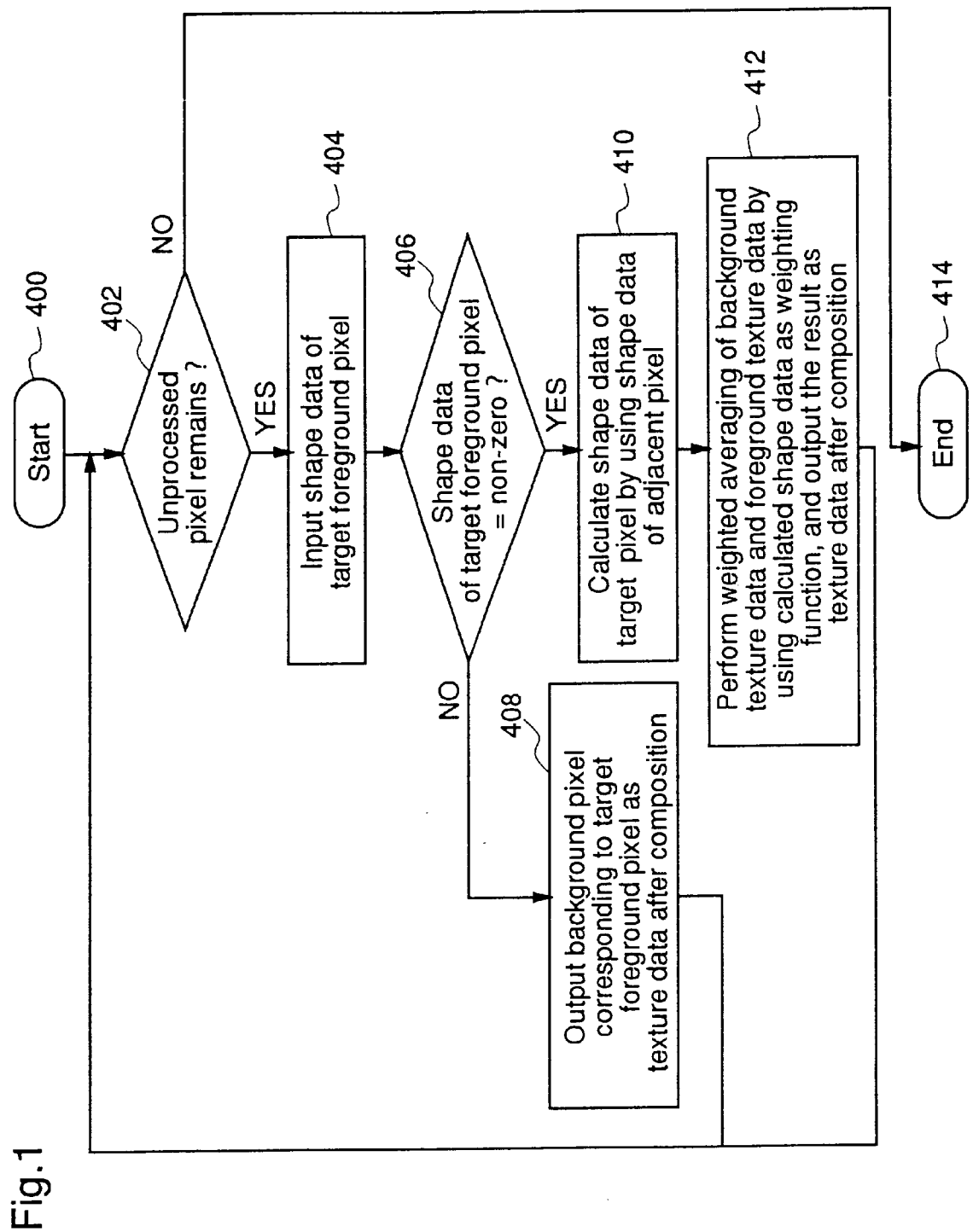
FIG. 1 is a flowchart for explaining an image composition method according to a first embodiment of the present invention.

FIG. 1 is a flowchart for explaining the process steps in the image composition method according to the first embodiment of the invention. FIGS. 2(a)–2(c) are diagrams schematically illustrating the process in step 410 shown in FIG. 1 in more detail.

In FIG. 2(a), reference numeral 302 denotes shape data corresponding to one line of pixels 300 including the boundary of the object shown in FIG. 25, on the coordinate plane in which the abscissa shows the pixel position and the ordinate shows the value of shape data. Each shape data is a multi-valued data taking a value in a range from 0 to 255.

A description is now given of the case where, among the shape data 302, the shape data 500 of a boundary pixel (target pixel to be processed) which is positioned inside and adjacent to the boundary of the object is subjected to pixel value conversion.

Initially, it is decided whether unprocessed pixels remain or not (unprocessed pixel decision step 402). When unprocessed pixels remain, the shape data of a foreground pixel to be processed (target foreground pixel) is input (shape data input step 404). When no unprocessed pixel remains, the composition process is ended (step 414).

Next, it is decided whether the shape data 500 of the target foreground pixel is "0" or not (shape data decision step 406). When the shape data is "0", the pixel value (texture data) of the background pixel corresponding to the target foreground pixel is output as the texture data of the composite pixel, thereby completing the composition process for the target foreground pixel (background pixel output step 408).

When the destination of the texture data of the composite pixel is a storage unit where the texture data of the background pixel is stored, the process of step 408 is dispensed with.

Subsequently, when the result of the decision in step 406 is that the shape data 500 of the target foreground pixel is "non-0", the shape data of the target foreground pixel is calculated by a predetermined method, using the shape data of all pixels in a target region, i.e., a region having a predetermined size and including the target pixel to be processed (shape data (composition ratio) calculation step 410). For example, the target region is a region 502 enclosed with a square in FIG. 2(b). The target region 502 comprises 3×3 pixels, includes the boundary 500 of the object, and has the target pixel in the center.

The array of pixels included in the target region is not restricted to 3×3 pixels, it may be M×N pixels (M,N=natural number). The size of the pixel array (length and width, pixel number, etc.) may be changed according to the foreground image to be processed. Further, different pixel arrays of target regions may be used for the respective processes of the luminance data and the chrominance data (components of the texture data).

In this first embodiment, the shape data of the nine pixels in the target region 502 are summed up and averaged, and the average shape data so obtained is used as the shape data of the target pixel. Thereby, the shape data 504 of the target pixel 506 is reduced as shown in FIG. 2(a).

In this method, since the shape data of the target pixel is calculated with regard to the shape data of the pixels in the target region 500, variation of shape data of plural pixels arranged at both sides of the boundary of the object can be made gentle.

Finally, in pixel composition step 412, the shaped data 504 calculated as described above is used as the composition ratio for composition of texture data, and the texture data of the target foreground pixel and the texture data of the corresponding background pixel are subjected to weighted averaging by using formula (1), and the texture data composited between the foreground image and the background image is output as texture data of a pixel of the composite image corresponding to the target pixel.

As described above, according to the first embodiment of the present invention, only the shape data of pixels, which are positioned inside and adjacent to the boundary of image of an object, are subjected to smoothing to make the distribution of the shape data of the pixels in the vicinity of the boundary smooth. Then, using the shape data obtained by the smoothing as the composition ratio, composition of texture data is carried out between a foreground pixel positioned inside the boundary of the object and the corresponding background pixel. Therefore, the image quality at the boundary between the foreground image and the background image in the composite image is improved.

In this first embodiment, the shape data may be either multi-valued data having a value in a range from 0 to 255, or binary data having a value of "0" or "non-0".

When the shape data is binary data, as shown in table 508 of FIG. 2(c), the shape data of the target pixel may be calculated as follows. Initially, the number of pixels whose shape data are "non-0" is obtained from the pixels in the target region 502. Then, the number of the pixels having "non-0" (count) is divided by the number of pixels in the target region 502 (range-count) to obtain a value (count/range-count), and this value is multiplied by the shape data of "non-0" (alpha value). Although alpha-value is 255 in the formula in table 508, it may be an intermediate value in a range from 0 to 255.

On the other hand, when the shape data is multi-valued data as described above, the average of the shape data of the pixels in the target region may be used as the shape data of the target pixel.

Embodiment 2

FIGS. 3(a)–3(d) are diagrams for explaining an image composition method according to a second embodiment of the present invention, schematically illustrating the process of composition ratio calculation step 410 in the composition method.

The image composition method of this second embodiment is different from that of the first embodiment only in that, when calculating the shape data in step 410, an additional process is performed to smooth the distribution of composition ratios of pixels positioned in the vicinity of the boundary. Other steps of this second embodiment are identical to those already described for the first embodiment and, therefore, do not require repeated description.

In FIG. 3(a), reference numerals 300, 302, 500 and 502 designate the same elements as those shown in FIGS. 25 and 2.

The composition ratio calculation step 410 according to this second embodiment includes the process of changing the composition ratios (shape data) of pixels positioned inside the boundary of the object. As the pattern of pixel array (3×3 pixels) in the target region including the target pixel, besides the pattern of the target region 502 shown in FIG. 3(a), patterns of pixel arrays 610, 612, and 614 shown in FIG. 3(d) are used in many cases.

With respect to the target region having such pattern of pixel array, the number of pixels whose shape data are "non-0" is calculated. When the calculated number is equal to or smaller than a predetermined value, the shape data of the target pixel is "0". When the calculated number exceeds the predetermined value, the shape data of the target pixel takes an intermediate value between 0 and the maximum value of the shape data (255 in FIG. 3(c)).

More specifically, using the conditional expression shown in table 608 of FIG. 3(c), the composition ratio (shape data) of the target pixel is calculated.

According to the conditional expression shown in table 608, when the number of pixels whose shape data are "non-0" is equal to or smaller than the threshold value, the composition ratio (shape data) of the target pixel is "0". When the pixel number is larger than the threshold value, the composition ratio is calculated so that the shape data of the target pixel takes an intermediate value between "0" to "non-0" (255 in FIG. 3(b)), by using the number of the pixels of "non-0" in the target region. According to the conditional expression, the composition ratios of the pixels positioned at the boundary of the image of the object can be varied, thereby improving the image quality at the boundary of the foreground image in the composite image of the foreground image and the background image.

The threshold used in the conditional expression shown in table 608 varies according to the size of the target region.

Further, although alpha value used in the conditional expression is 255 in this second embodiment, it may be an intermediate value between 0 and 255.

As described above, according to the second embodiment of the invention, the number of pixels whose shape data are "non-0" is calculated, and the shape data of pixels positioned at the boundary of the object are processed so that the distribution of their values, i.e., composition ratios, becomes more smooth, and thereafter, composition of the foreground image and the background image is performed by the use of the composition ratios so obtained. Therefore, the image quality at the boundary of the foreground image and the background image in the composite image is further improved.

Embodiment 3

Figure 4:
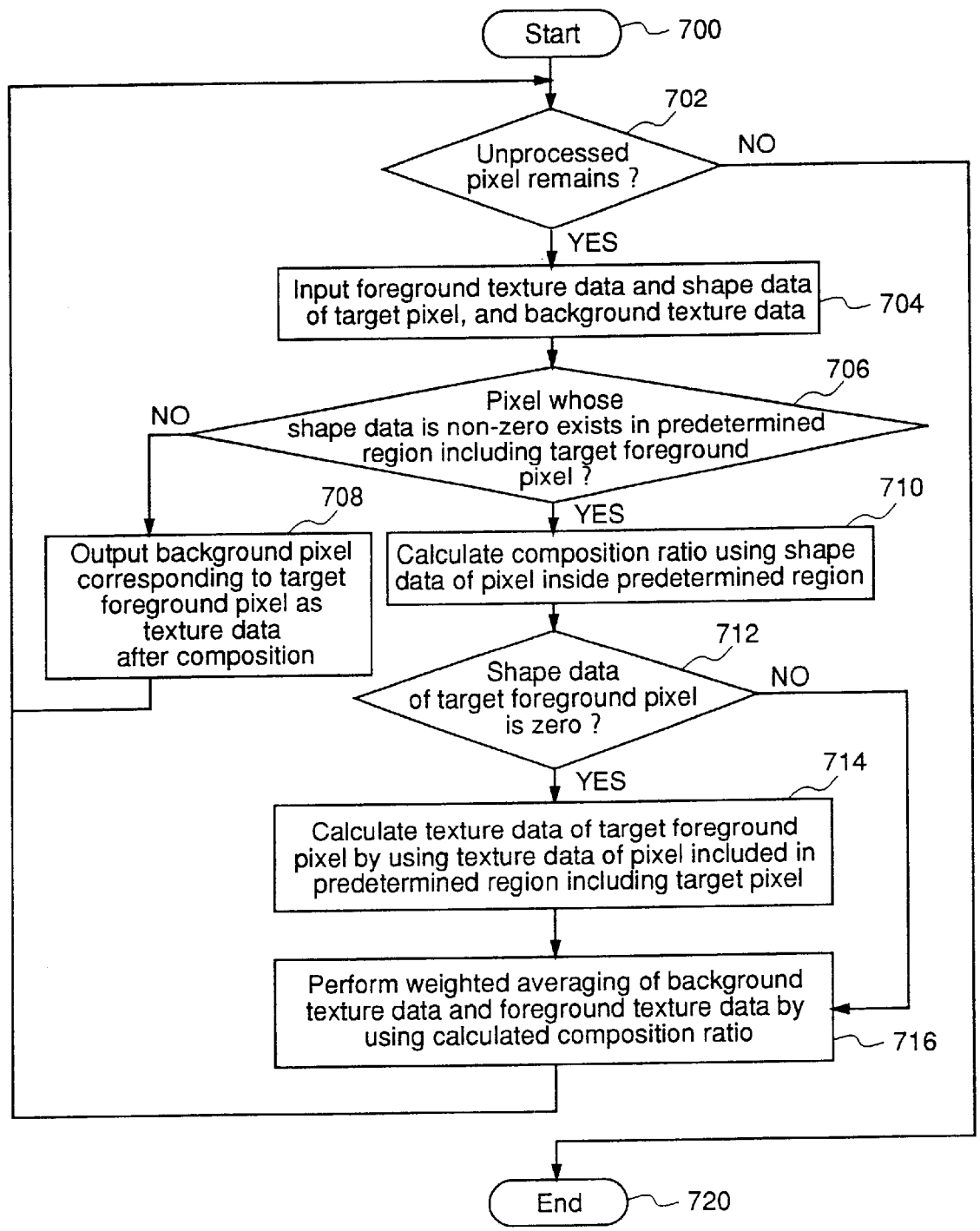
FIG. 4 is a flowchart for explaining an image composition method according to a third embodiment of the present invention.

FIG. 4 is a flowchart for explaining an image composition method according to a third embodiment of the present invention. FIGS. 5(a)–5(c) are diagrams schematically illustrating shape data generating step 710 and pixel data generating step 714 in the flowchart of FIG. 4.

In the image composition method according to this third embodiment, the composition ratios of pixels at the boundary of the foreground image are obtained by smoothing with reference to the shape data of boundary pixels and, using the composition ratios so obtained, composition of texture signals is performed between the foreground image and the background image. In the composition process, the texture data of pixels positioned outside the boundary of the foreground image are generated by using the texture data of pixels positioned inside the boundary, thereby improving the quality of the composite image.

In FIGS. 5(a)–5(c), reference numeral 302 denotes one line of pixels included in a region 300 which has already been described with respect to FIG. 25. A description is given of the case where a boundary pixel 306, which is included in the one line of pixels 302 and positioned outside the object boundary, is subjected to conversion of shape data. Further, FIG. 5(d) shows a region 800 in the texture space, corresponding to the region 300 in the shape space.

Initially, it is decided whether unprocessed pixels remain or not (unprocessed pixel decision step 702). When unprocessed pixel remain, texture data and shape data of pixels inside a target region (in FIG. 4, predetermined region) having a foreground pixel to be processed (target foreground pixel) in the center are input (pixel input step 704). In FIGS. 5(b) and 5(d), reference numeral 306 designates a shape pixel to be processed (target pixel), and numeral 804 designates a texture pixel corresponding to the shape pixel 306. The target region is a region of a predetermined size in the shape space (the texture space) having the pixel 306 (804) in the center. FIGS. 5(b) and 5(d) show target regions 802 and 806 (regions enclosed with squares), each comprising 3×3 pixels, respectively. The size of the target region is not restricted to 3×3 pixels, it may be M×N pixels (M,N=natural numbers). The size (length and width, pixel number, etc) of the target region may be changed according to the foreground image to be processed. Further, different sizes of target regions may be used for the respective processes of the luminance data and the chrominance data which are components of the texture data.

Next, it is decided whether or not any of the pixels in the target region 802 having the target foreground pixel 306 in the center has the shape data of "non-0" (shape data decision step 706). When none of the pixels has the shape data of "non-0", the texture data of the background pixel corresponding to the target foreground pixel 804 is output as the texture data of the composite pixel (background pixel output step 708). When the destination of the texture data of the composite image is a storage unit where the texture data of the background pixel is stored, the process of step 708 is dispensed with.

On the other hand, when at least one of the pixels in the target region 802 has the shape data of "non-0", the shape data of all the pixels in the target region 802 are summed up, and the sum is divided by the number of the pixels in the target region 802 (9 in FIG. 5) (composition ratio calculating step 710). The composition ratio obtained as the result of the division (shape data 808 in FIG. 5(c)) is used as a weighting function when composition of texture data between the foreground image and the background image is carried out in pixel composition step 716 described later.

Subsequently, it is decided whether the shape data of the target pixel 306 in the shape space is "0" or not (shape data decision step 712). When it is "0", since the texture data of the texture pixel 804 corresponding to the target pixel 306 is undetermined, the texture data of texture pixels, which are included in the predetermined region 806 in the texture space (i.e., the region corresponding to the target region in the shape space) and correspond to the shape pixels whose shape data are "non-0", are summed up (pixel data generation step 714). Then, the sum of the texture data so obtained is divided by the number of the texture pixels corresponding to the shape pixels of "non-0", and the obtained average value is used as the texture data of the texture pixel 804. In the region 806 shown in FIG. 5(d), two pixels (dotted pixels) correspond to the texture pixels corresponding to the shape pixels whose shape data are "non-0", and the sum of the texture data is divided by 2, and the result is used as the texture data of the texture pixel 804. FIG. 5(e) shows the average value 820 of the texture data of the texture pixel 804.

On the other hand, when the shape data of the target shape pixel 306 is "non-0", since the corresponding texture pixel has its texture data, step 714 is not performed. Also when the texture data of the corresponding texture pixel has previously been filled with some value, step 714 is not performed. For example, when the value of coding distortion included in the decoded texture signal is retained and this value is not far apart from the value of the adjacent pixel, the process of step 714 is dispensed with.

Finally, by using the composition ratio obtained in step 710 (shape data 808 of the target pixel shown in FIG. 5(c)) as a weighting function, composition of texture data is carried out between the target foreground pixel and the corresponding background pixel (pixel composition step 716). This composition employs formula (1).

While in this third embodiment the shape data calculation step 710 for the target pixel is followed by the shape data decision step 712, these steps may be performed in parallel.

As described above, according to the third embodiment of the invention, smoothing of texture data or shape data is performed to the pixels positioned outside and adjacent to the boundary of the object. Therefore, although the image at the boundary sometimes blurs, since the values of the shape data possessed by the pixels inside and adjacent to the boundary of the object are not decreased, even when the size of the object is very small, the image of the foreground object can be composited with the background image without shrinkage of the foreground image. Therefore, one of the composition process according to the first and second embodiments and the composition process according to the third embodiment may be selected in response to the input image. Further, since the texture data is composed of luminance data and chrominance data, the texture data may be processed by switching the composition process between the luminance data and the chrominance data.

Also in this third embodiment, the shape data may be either multi-valued data having a value in a range from 0 to 255, or binary data having a value of 0 or non-0.

Although formula (1) is used for the composition methods of the first to third embodiments, formula (2) may be used. In this case, assuming that the composition ratio calculated by using the shape data of pixels in the target region including the target pixel is $\beta$, the same process as described above is achieved by multiplying the foreground value fgpel' with $\beta$/alpha'.

Embodiment 4

An image composition method according to a fourth embodiment of the invention is direct to speed-up of the composition ratio calculation step described for the first to third embodiments. Other processes are identical to those already described for the first to third embodiments.

In the composition methods according to the first to third embodiments, the composition ratio is obtained by calculation. When the shape data of the target pixel is binary data taking "0" or "non-0", the composition ratio is obtained after calculating the number of shape pixels whose shape data are "non-0", based on the formula in table 508 shown in FIG. 2(c) or the formula in table 608 shown in FIG. 3(c). However, since this calculation includes division and multiplication, the amount of calculations is considerable when the process is performed pixel by pixel.

In this fourth embodiment, a region comprising 3×3 pixels, such as a region enclosed by a square in FIG. 6, is determined as a target region, and the composition ratios corresponding to the numbers (0–9) of pixels whose shape data are "non-0" are calculated in advance to be stored in table 900 as shown in FIG. 6.

In actual calculation, initially, the number of pixels whose shape data are "non-0" in the target region is calculated. Then, in the table 900, the composition ratio corresponding to the pixel number is referred to, whereby division and multiplication can be reduced. Although table 900 contains the composition ratios adapted to the composition method of the first and third embodiments, a similar table adapted to the composition method of the second embodiment may be employed.

Embodiment 5

In an image composition method according to a fifth embodiment of the present invention, not only the composition ratios but the values obtained by multiplying the respective composition ratios and the pixel data are stored in a table, whereby the calculation of formula (1) to obtain the texture data of the composite pixel can be simplified.

Generally, at the boundary of an object, pixels have similar composition ratios (shape data) in many cases, and this holds good for texture data, too.

Hence, in this fifth embodiment, the values obtained by multiplying the composition ratios and the texture data are stored in a table, and the values in the table are referred to according to the composition ratio and the texture data, whereby redundant division and multiplication can be reduced.

Formula (1) is expanded as shown in FIG. 7, and multiplication in the expanded formula is replaced with the process of referring to table 1000 to reduce the amount of calculations.

Furthermore, in the case where the composition ratio of the target pixel is obtained from the number of pixels whose shape data are "non-0", formula (1) is expanded as shown in FIG. 8, and the result of multiplication in the expanded formula is stored in table 1100, whereby the composition ratio of the target pixel can be calculated from the number of pixels whose shape data are "non-0" in the target region, and the value of the texture data. In this case, the number of indices in the table prepared in advance can be reduced.

For example, the number of indices is smaller when using, as an index in the table, a combination of "pixels's texture value" and "number of pixels positioned inside the object in the target region including the target pixel" than using a combination of "pixel's texture value" and "combination ratio". To be specific, assuming that the pixel's texture value and composition ratio (shape data) range from 0 to 255, when using the combination of "pixel's texture value" and "composition ratio", 65536 (=256×256) indices are needed. On the other hand, when using the combination of "pixel's texture value" and "pixel number", even if the pixel's texture data take 256 values, since the number of pixels in the object is only 10 (0–9), the number of indices is only 2560 (=256×10).

In FIGS. 7 and 8, "pixel data" or "pixel value" means "texture data".

Further, also in formula (2), by referring to a table for the term of multiplying the background pixel value (texture data), the amount of calculations can be reduced as in formula (1).

It is needless to say that the composition process using the table according to the fourth or fifth embodiment can be applied to the composition method of the second embodiment.

Embodiment 6

Figure 10:
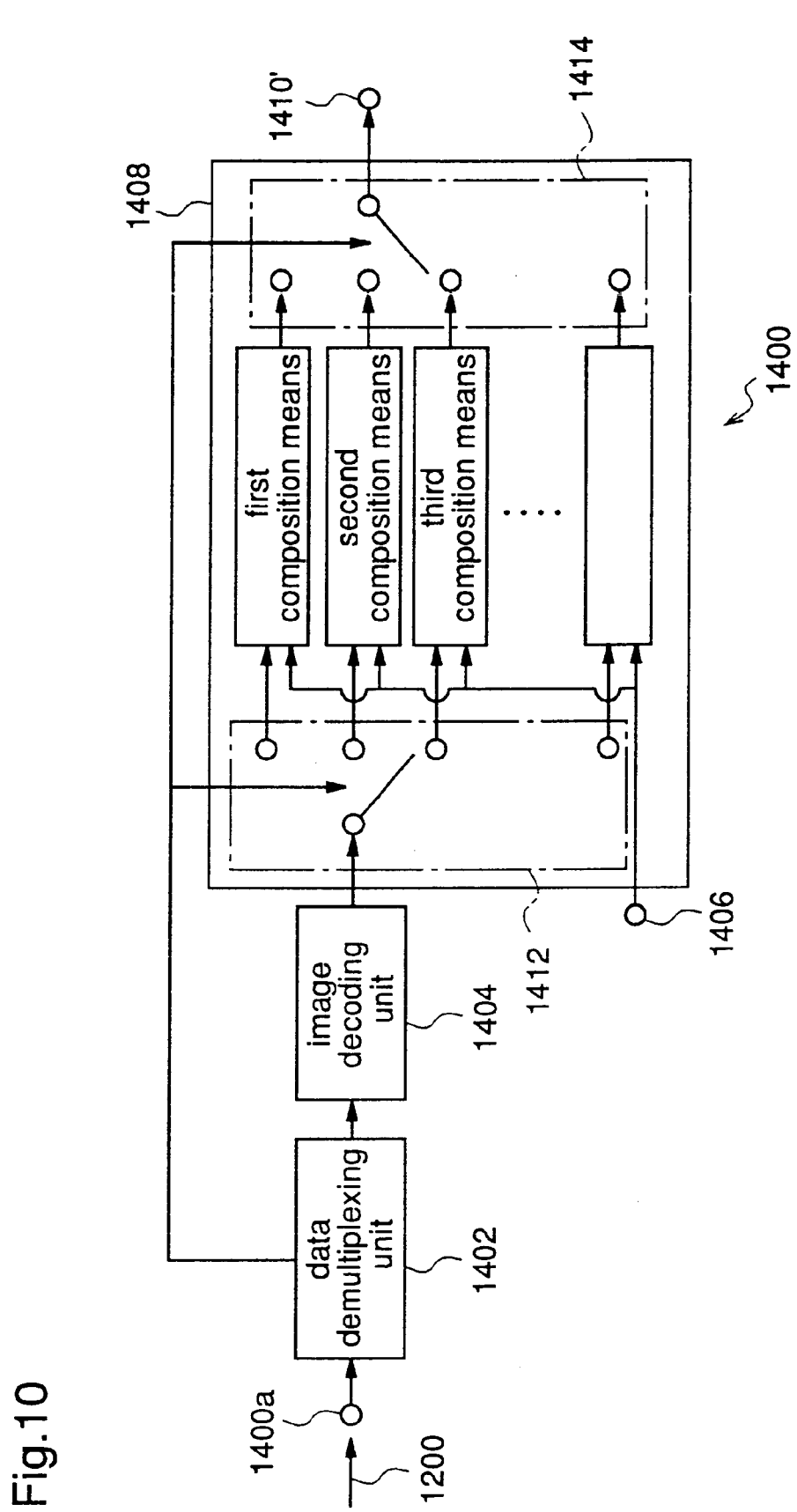
FIG. 10 is a block diagram illustrating an image composition method according to the sixth embodiment.

FIG. 10 is a block diagram illustrating an image composition apparatus (decoding/composition apparatus) according to a sixth embodiment of the present invention. This image composition apparatus is for decoding coded data obtained by coding an image signal corresponding to each object, which coded data includes additional information indicating whether or not boundary pixels are to be subjected to smoothing of shape data or the like.

Figure 9:
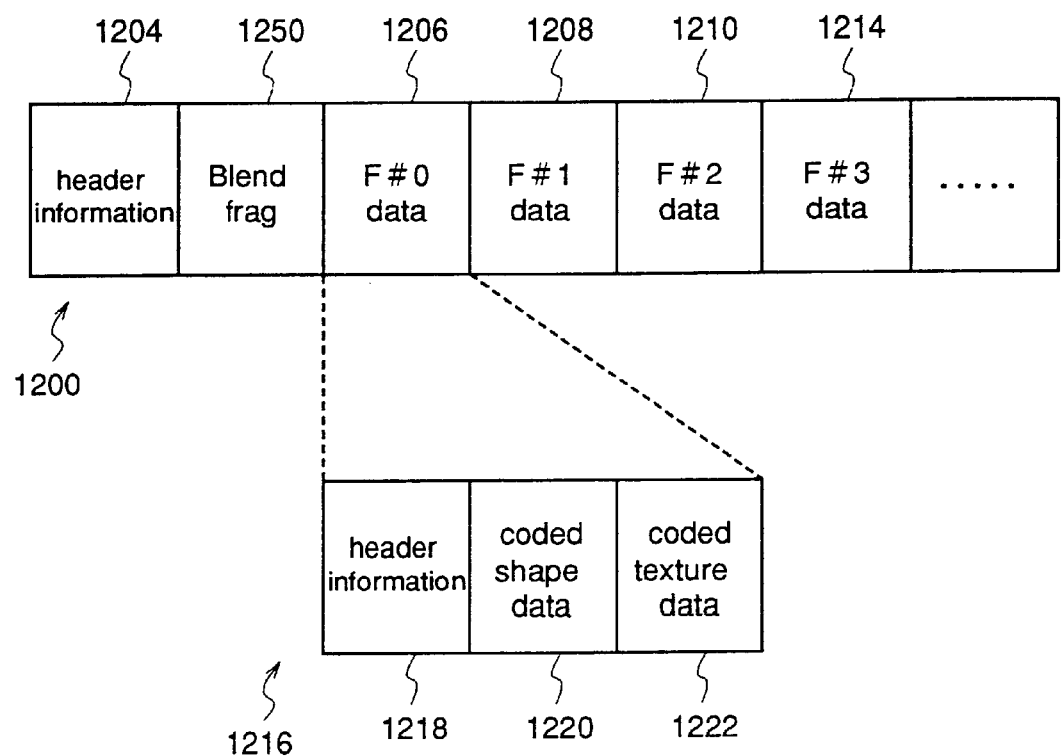
FIG. 9 is a diagram illustrating the data structure of a bit stream handled in an image composition method according to a sixth embodiment of the present invention.

FIG. 9 shows the data structure of a bit stream 1200 which is coded data having addition information 1250 as described above.

In the bit stream 1200, header information 1204 containing information, such as the number of data included in the stream, is placed at the beginning, and the header information 1204 is followed by the additional information 1250, and the addition information 1250 is followed by coded data 1206, 1208, 1210, and 1214 in unit periods of the object.

The coded data 1206 is divided into header data 1218 describing information for data decoding, coded shape data 1220, and coded texture (pixel) data 1222. The shape data has been coded by an arithmetic coding method such as JBIG and further subjected to variable-length coding, and the texture data has been coded by a coding method such as DCT and further subjected to variable-length coding.

In the bit stream 1200 having the above-described data structure, additional information (Blend flag) 1250 of one bit is added to the header information 1204. The additional information 1250 indicates whether or not smoothing of texture data or shape data is performed at the boundary of the object in the composition process according to any of the first to fifth embodiments. Thereby, it is possible to decide, for each object, as to whether the image composition process according to any of the first to fifth embodiments is performed or not. The header information 1204 contains the size (length and width) of the target region described for each embodiment (for example, 3×3 pixels), the number of pixels, etc.

When multiple-bit additional information is added, switching of the smoothing methods or information required for the smoothing is easily realized. For example, when the plane patterns of the target regions, which are shown in the first to fifth embodiments, are added as additional information, the plane pattern of the target region (length and width of the region, pixel number, etc) can be changed for each image to be processed.

Although the additional information (Blend flag) 1250 is inserted between the header information 1204 and the coded data 1206, it may be inserted somewhere between the coded data 1206, 1208, 1210, and 1214. In this case, the composition process can be changed from the data which follows the additional information.

Moreover, additional information (Blend flag) similar to the additional information 1250 may be added to each header data 1218 included in each of the coded data 1206, 1208, 1210, and 1214. In this case, the composition process according to any of the first to fifth embodiments can be performed to only the coded data in a specific period.

Although the additional information is included in the bit stream 1200, it may be given as side information separated from the bit stream 1200.

A description is now given of the image composition apparatus according to the sixth embodiment.

In FIG. 10, the image composition apparatus 1400 comprises a data demultiplexing unit 1402 which receives the bit stream 1200 and separates the header information, coded shape data, and coded texture data from the bit stream 1200; an image decoding unit 1404 which decodes the coded data output from the demultiplexing unit 1402; and a composition unit 1408 which comprises a plurality of composition means, and performs composition of the coded data by a composition means specified by the additional information included in the header information.

The composition unit 1408 includes first and second selector switches 1412 and 1414. The first switch 1412 selects one composition means to which the output of the image decoding unit 1404 is to be applied, from the plural composition means, based on the additional information, and the second switch 1414 selects one of the plural composition means, based on the additional information. At least one of the plural composition means included in the composition unit 1408 performs composition by an image composition method according to any of the first to fifth embodiments.

Next, the operation of the image composition apparatus will be described.

When the bit stream 1200 is input to the apparatus through the input terminal 1400a, coded data (shape data and texture data) are separated from the bit stream 1200 by the data demultiplexing unit 1402. These coded data are decoded by the decoding unit 1404. On the other hand, the additional information 1250 included in the bit stream 1200 is input to the composition unit 1408, wherein a composition means using a composition method adapted to the additional information 1250 is selected by the switches 1412 and 1414.

The apparatus may have a plurality of decoding units 1404 to perform parallel decoding for input bit streams corresponding to plural objects.

Background pixel data which has already been decoded (or generated) and stored is input to the apparatus through the second input terminal 1406 and sent to the composition unit 1408. In the composition unit 1408, composition of the foreground image and the background image is carried out by the composition method adapted to the texture data or the shape data which has been decoded by the decoding unit 1404. The composite data is output through the output terminal 1410.

Figure 11:
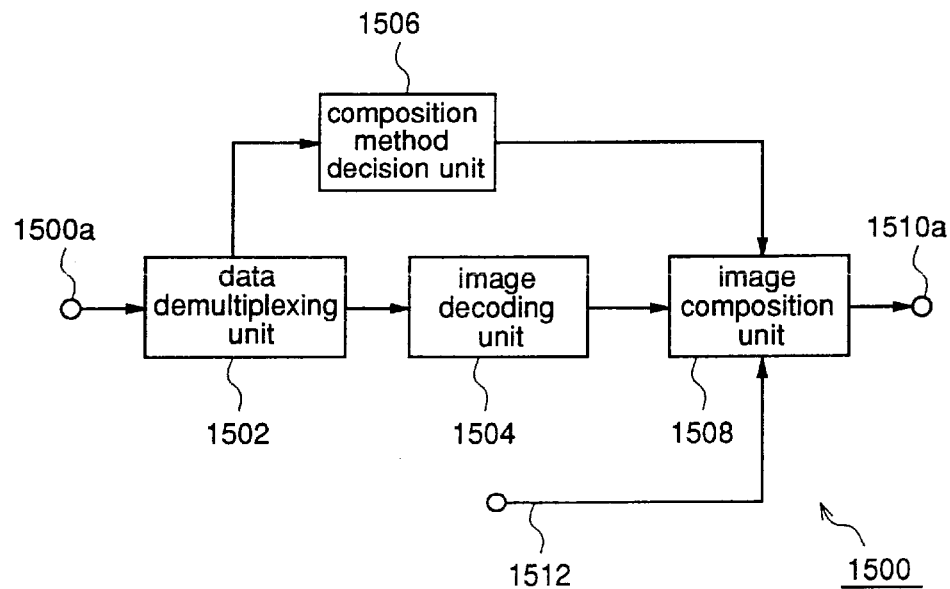
FIG. 11 is a block diagram illustrating an image composition apparatus according to a modification of the sixth embodiment.

Next, an image composition apparatus according to a modification of the sixth embodiment will be described with reference to FIG. 11.

An image composition apparatus 1500 according to this modification decodes a bit stream in which additional data for composition, which indicates the plane pattern of the target region to be used for the composition method according to any of the aforementioned embodiments, is included in the additional information 1250.

To be specific, the image composition apparatus 1500 includes a data demultiplexing unit 1502 and an image decoding unit 1504. The data demultiplexing unit 1502 receives a first bit stream corresponding to a foreground image, and separates coded data (coded shape data and coded texture data), a composition method, and additional information required for composition, from the bit stream. The image decoding unit 1504 decodes the coded data output from the demultiplexing unit 1502.

Further, the image composition unit 1500 includes a composition method decision unit 1506 and an image composition unit 1508. The composition method decision unit 1506 calculates information required for composition, using the additional information. The image composition unit 1508 composites the texture data of the foreground image and the texture data of the background image which has already been decoded, generated, or stored, based on the decoded shape data and texture data and the composition method output from the composition method decision unit 1506.

The image composition unit 1508 performs image composition by an image composition method according to any of the first to fifth embodiments.

When the bit stream 1200 is input to the apparatus through the input terminal 1500a, coded data (coded shape data and texture data) are separated from the bit stream 1200 by the data demultiplexing unit 1502, and additional information required for composition is separated from the bit stream 1200 as well. The additional information is input to the composition method decision unit 1506, while the coded data are decoded by the decoding unit 1504.

In the composition method decision unit 1506, information required for composition is calculated by using the input additional data. Further, in the image composition means 1508, composition is carried out by using the decoded shape data and texture data, the composition method input from the composition method decision unit 1506, and the background texture data input to the second input terminal 1512, which texture data has already been decoded (or generated) and stored. The composite data is output from the output terminal 1510.

Embodiment 7

FIGS. 12–15 are diagrams for explaining an image composition method according to a seventh embodiment of the present invention.

In the image composition method according to the seventh embodiment, when compositing texture signals between a foreground image and a background image, composition is carried out by referring to additional information indicating the shape of the foreground image (object), whereby redundant calculation is reduced.

Figure 12:
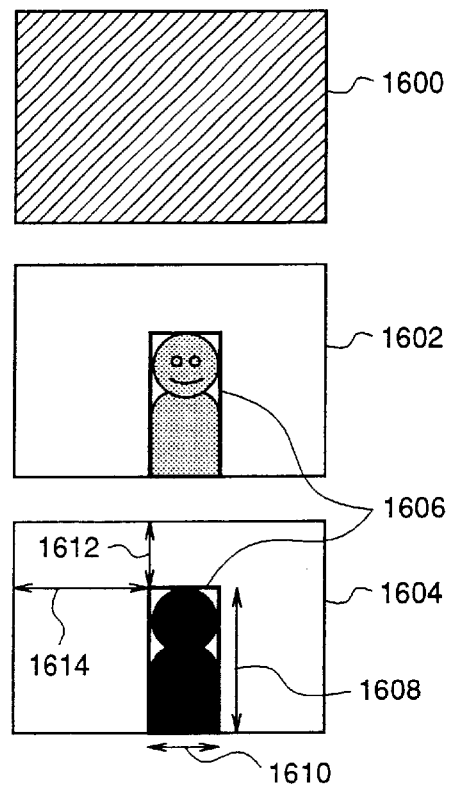
FIG. 12 is a schematic diagram for conceptually explaining an image composition method according to a seventh embodiment of the present invention.
Figure 23:
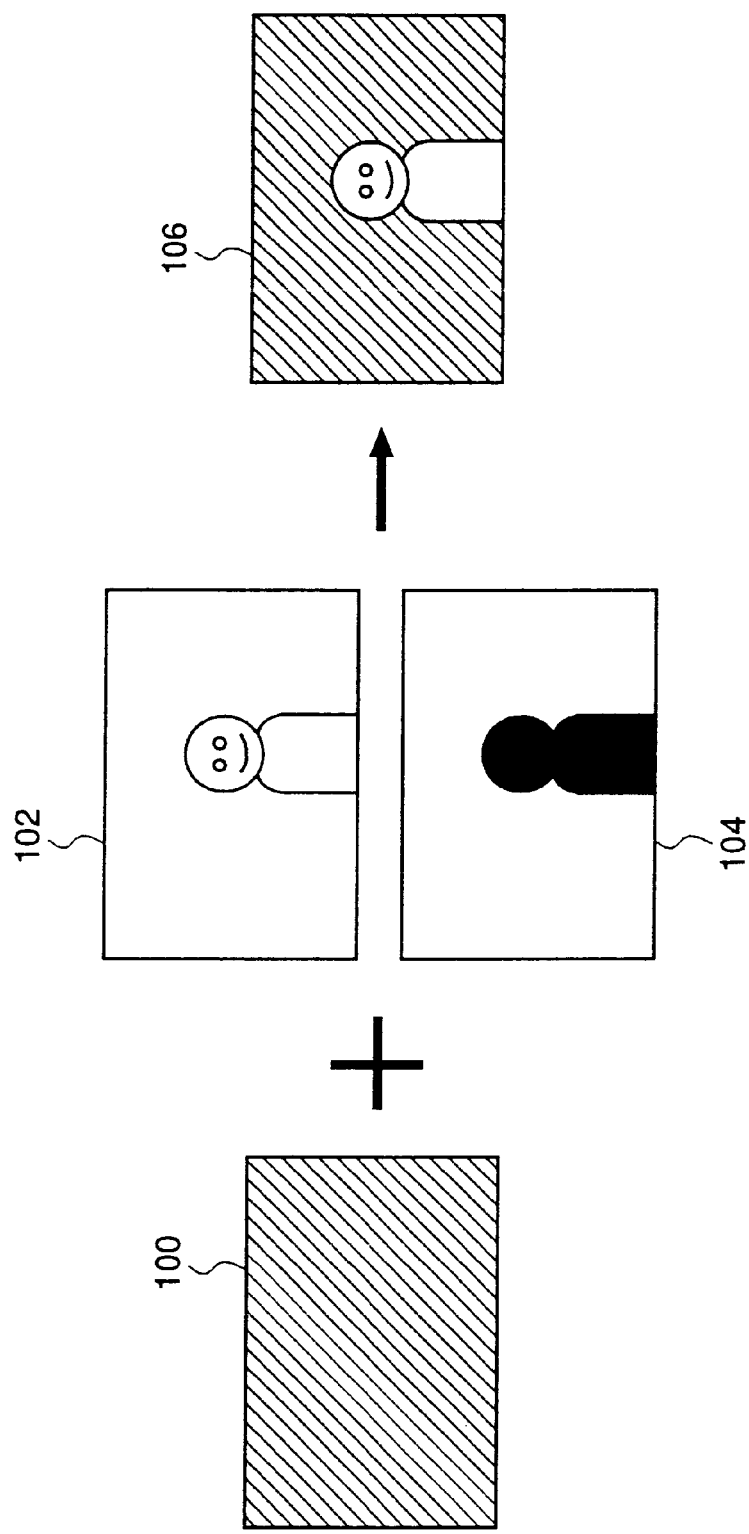
FIG. 23 is a diagram for explaining a conventional image composition process for compositing a plurality of images.

FIG. 12 conceptually illustrates a composition process between a background image and a foreground image. In FIG. 12, reference numeral 1600 designates a background image obtained from a background texture signal (background texture space), numeral 1602 designates a foreground image obtained from a foreground texture signal (foreground texture space), and numeral 1604 designates a foreground shape image obtained from a foreground shape signal (foreground shape space). These images 1600, 1602, and 1604 are identical to the background image 100, the foreground image 102, and the foreground shape 104 shown in FIG. 23, respectively.

In the foreground image 1602, the object occupies an area less than half of the whole. In this case, a portion to be subjected to decision of a composition method is only the pixels included in a region 1606 enclosing the object (hereinafter, also referred to as an object region) or the pixels positioned outside and adjacent to the object region 1606. So, for the pixels other than those mentioned above, texture data of the background image 1600 (values of the respective pixels of the texture signal) may be used.

Furthermore, in FIG. 12, reference numeral 1608 and 1610 denote the length and the width of the object region 1606 obtained from the shape signal forming the foreground image 1604, and numerals 1612 and 1614 denote vertical and horizontal displacements indicating the position of the object region 1606 in the foreground shape image 1604 from the upper-left corner of the image 1604. In the image composition method of this seventh embodiment, additional information, such as the sizes 1608 and 1610 of the object region 1606 and the displacements 1612 and 1614, is received when performing composition, and it is decided, with reference to the additional information, whether composition is required or not for only the pixels in the vicinity of the object region 1606 enclosing the object in the foreground image 1602.

Figure 13:
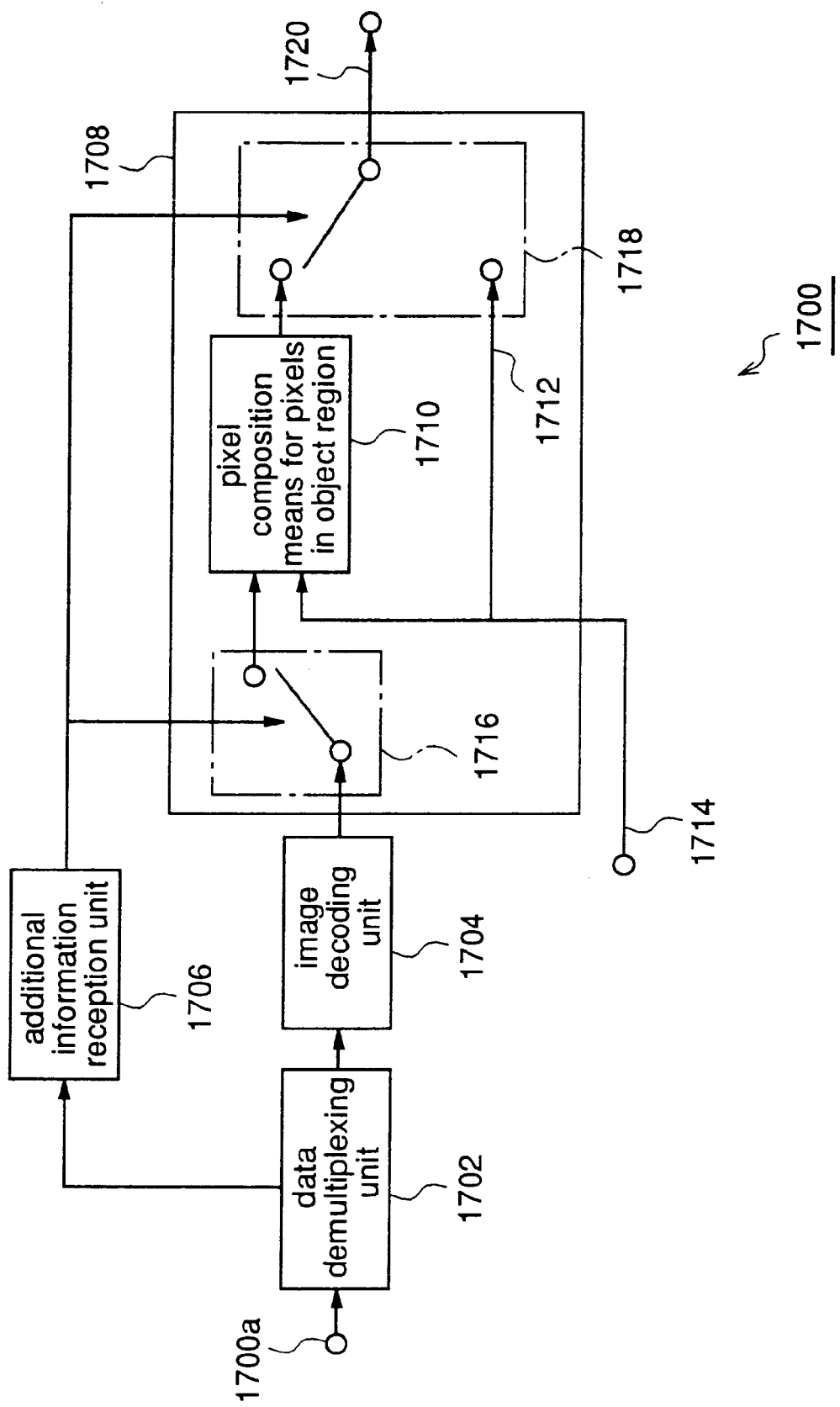
FIG. 13 is a block diagram illustrating an image composition apparatus according to the seventh embodiment.

FIG. 13 is a block diagram illustrating an image composition apparatus (decoding/composition apparatus) 1700 using the composition method according to the seventh embodiment.

The image composition apparatus 1700 includes a data demultiplexing unit 1702, an image decoding unit 1704, and an additional information reception unit 1707. The data demultiplexing unit 1702 receives a first bit stream corresponding to a foreground image, and separates coded data (coded shape data and coded texture data) and additional information required for composition, from the bit stream. The image decoding unit 1704 decodes the coded data output from the demultiplexing unit 1702. The additional information reception unit 1707 receives and outputs the separated additional information.

Further, the image composition apparatus 1700 includes a composition unit 1708 which performs composition of the foreground image and the background image, based on the additional information from the additional information reception unit 1707. The composition unit 1708 includes an intra-object-region pixel composition means 1710 which performs composition of texture signals corresponding to pixels within the object region between the background image and the foreground image.

The pixel composition means 1710 performs composition by an image composition method according to any of the first to fifth embodiments.

The composition unit 1708 further includes an on-off switch 1716 and a selector switch 1718. The on-off switch 1716 controls supply of the decoded data from the image decoding unit 1704 to the pixel composition means 1710 according to the additional information from the additional information reception unit 1707, and the selector switch 1718 selects either the texture signal of the background image or the data output from the pixel composition means 1710 according to the additional information.

The apparatus so constructed operates as follows.

The input terminal 1700a of the image composition apparatus 1700 receives coded data having a data structure such as the bit stream 1200 in which a texture signal and a shape signal are coded. The input coded data are separated to the respective coded data by the data demultiplexing unit 1702. On the other than, the additional information, which indicates the size of the object and the position of the object in the image, is input to the additional information reception unit 1706.

The coded data corresponding to the texture signal and the shape signal are decoded by the image decoding unit 1704. The apparatus 1700 may have a plurality of decoding units to perform parallel decoding for a plurality of coded data.

The decoded shape signal and the decoded texture signal are input to the composition unit 1708 through the switch 1716, while the texture signal of the background image is input to the composition unit 1708 through the switch 1714. In the composition unit 1708, the texture signals of the foreground image and the background image are composited.

More specifically, in the composition unit 1708, with reference to the input information such as the size of the object, it is decided whether the pixel to be processed is positioned inside the object region or not. When the pixel to be processed is positioned inside the object region, the texture signals of the background image and the foreground image are composited to be output. When the pixel to be processed is positioned outside the object region, the texture signal of the background image is output as it is.

The texture signal of the background image may be a texture signal which has already been decoded (or generated) and stored in a memory, or a texture signal obtained by decoding coded texture data by means similar to the decoding unit 1704.

In the composition unit 1708, based on the texture signals of the background and foreground images and the shape signal of the foreground image, with reference to the additional information indicating the size and position of the object in the foreground image, it is decided whether a pixel as one of components of the foreground image is positioned inside the object region or not. According to the result of the decision, by using the switches 1716 and 1718, the composition process is switched between the composition inside the object region by the pixel composition means 1710 and the composition outside the object region. For the pixel outside the object region, texture data of the background image is used as it is.

Figure 15:
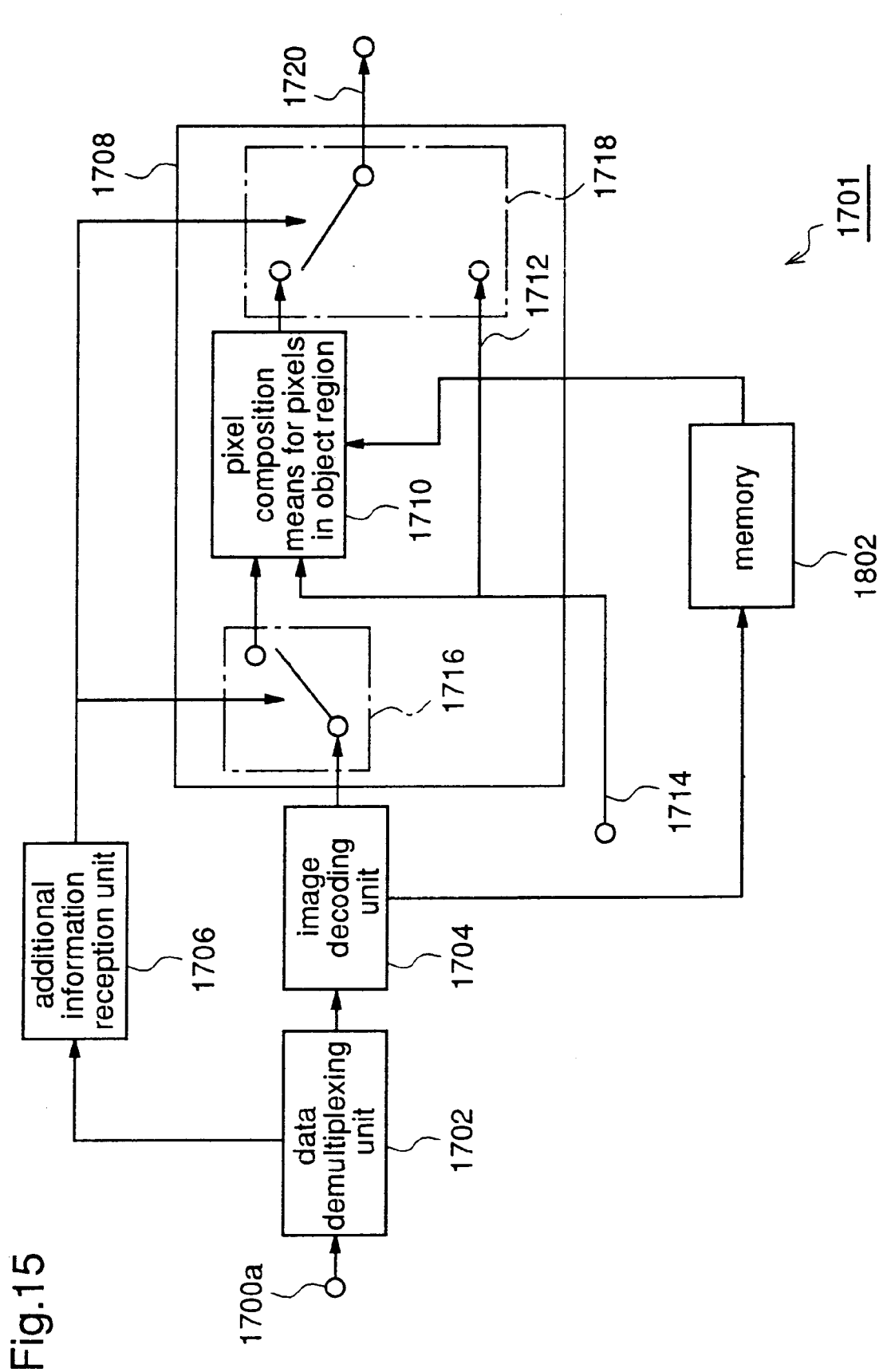
FIG. 15 is a block diagram illustrating an image composition apparatus according to the modification of the seventh embodiment.

FIG. 15 is a block diagram illustrating an image composition apparatus 1701 according to a modification of the seventh embodiment. The image composition apparatus 1701 includes, in addition to the constituents of the apparatus 1700 shown in FIG. 13, a memory 1802 for retaining the decoded texture and shape signals of the foreground image, and the size of the object in the foreground image.

In the image composition apparatus 1701 with the memory 1802, when compositing still images, the amount of processing can be reduced by using data which have already been decoded. The memory 1802 retains not only the decoded shape signal and texture signal but also additional information indicating the size and position of the object region in the shape image obtained in the decoding process, or the position of the boundary of the object region. When performing image composition, this additional information is input to the pixel composition means 1701, whereby the image composition apparatus 1700 performs in like manner as the image composition apparatus 1701 shown in FIG. 13. Thus, to supply the composition unit 1708 with the information such as the position of the boundary of the object region, dispenses with the process of deciding whether or not the pixel to be processed is positioned at the boundary of the object region.

Further, the information to be referred to for image composition, such as the size and position of the object region, may be sent from the decoding unit 1704 directly to the composition unit 1708 without using the additional information reception unit 1706.

The composition process according to this seventh embodiment enables definition of a region of the foreground image to be subjected to decision as to whether composition texture data between the foreground image and the background image should be performed in this region or not, whereby redundant calculation required for this decision can be reduced.

Furthermore, the additional information may include the size and position of the foreground image to be composited with the background image for display.

This case will be described in more detail with reference to FIG. 14.

Figure 14:
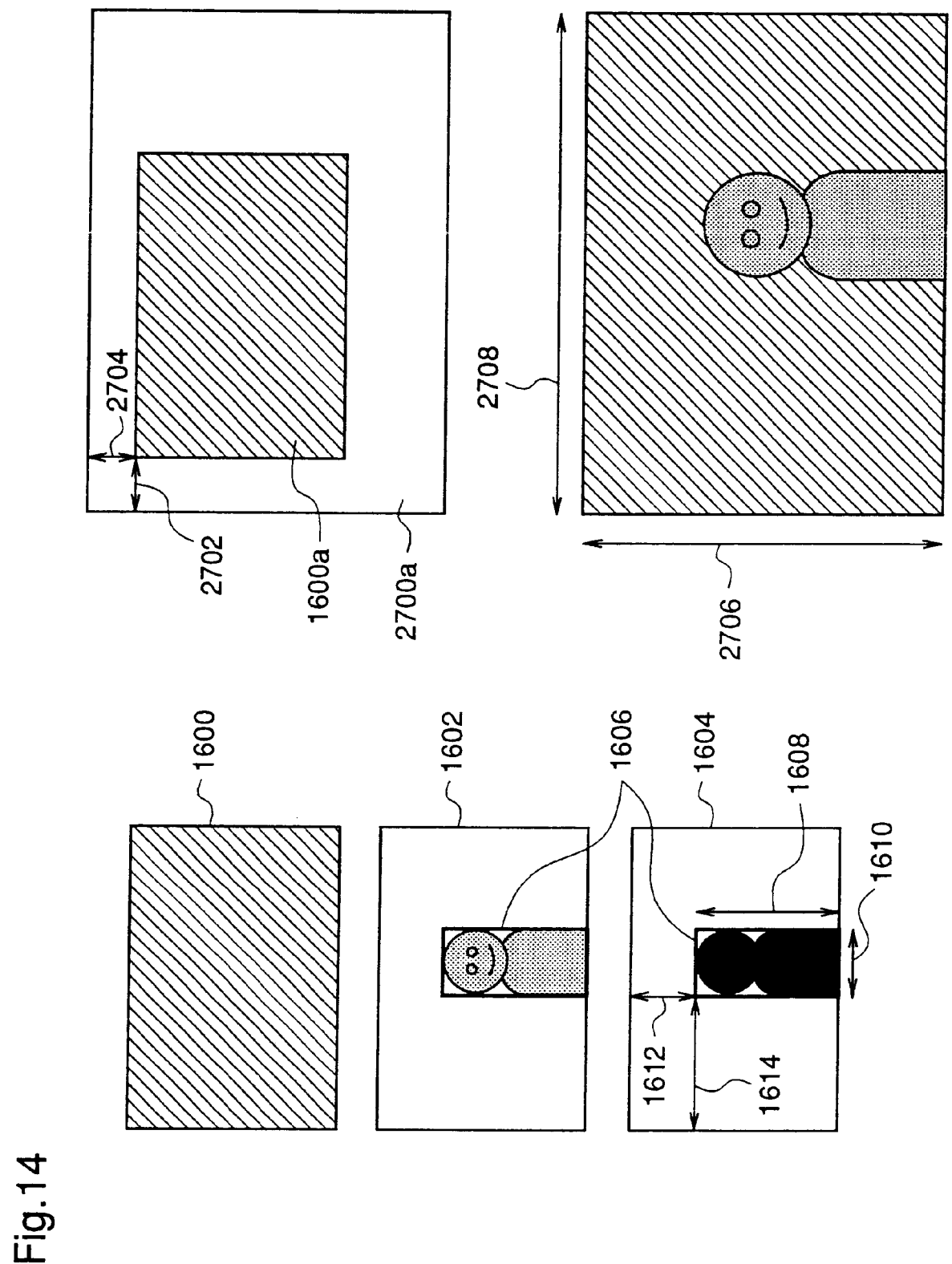
FIG. 14 is a diagram for conceptually explaining an image composition method according to a modification of the seventh embodiment.

In FIG. 14, the same reference numerals as those shown in FIG. 12 denote the same parts.

When performing composition of a foreground image and a background image by using a background texture signal (image 1600), a foreground texture signal (image 1602), and a foreground shape signal (image 1604) to produce a composite image 1600a, the composite image 1600a is sometimes enlarged for display, or displayed on another image 2700a.

In this case, the position (2704,2702) and the size (2708, 2706) of the composite image 1600a on the image 2700a are input in similar manner, whereby the display position and the display size can be varied according to the composite image.

Embodiment 8

Figure 16:
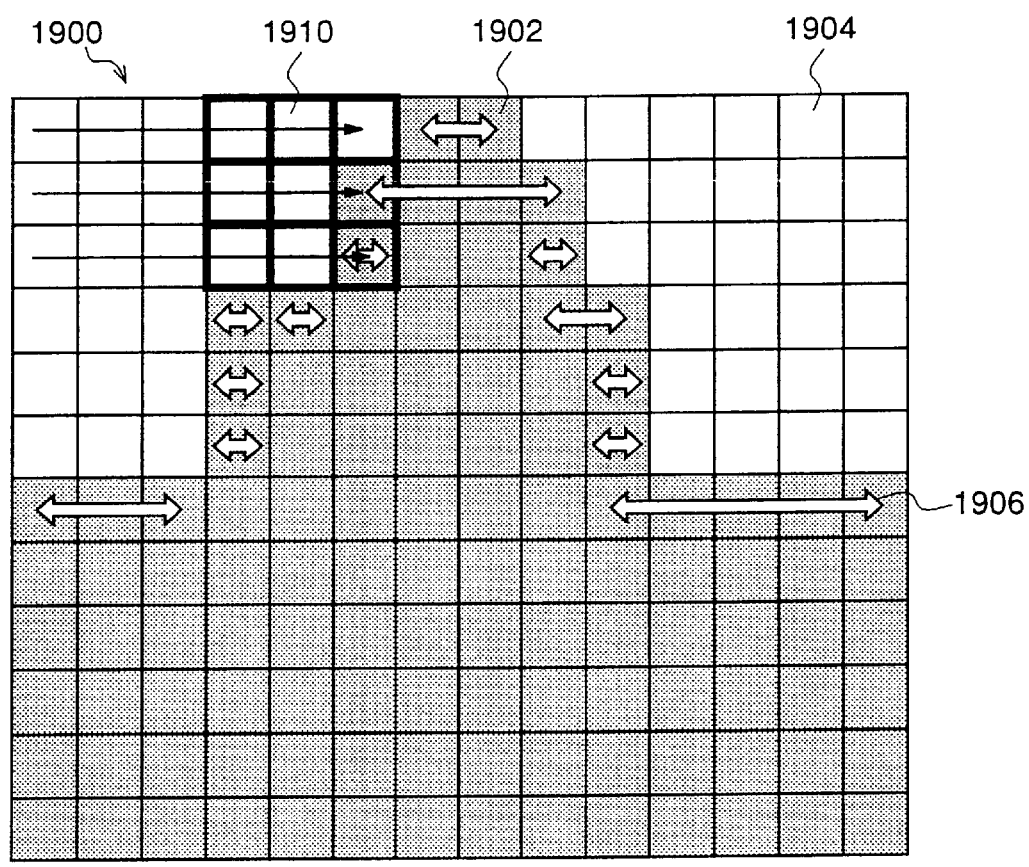
FIGS. 16 and 17 are diagrams for conceptually explaining an image composition method according to an eighth embodiment of the present invention.
Figure 17:
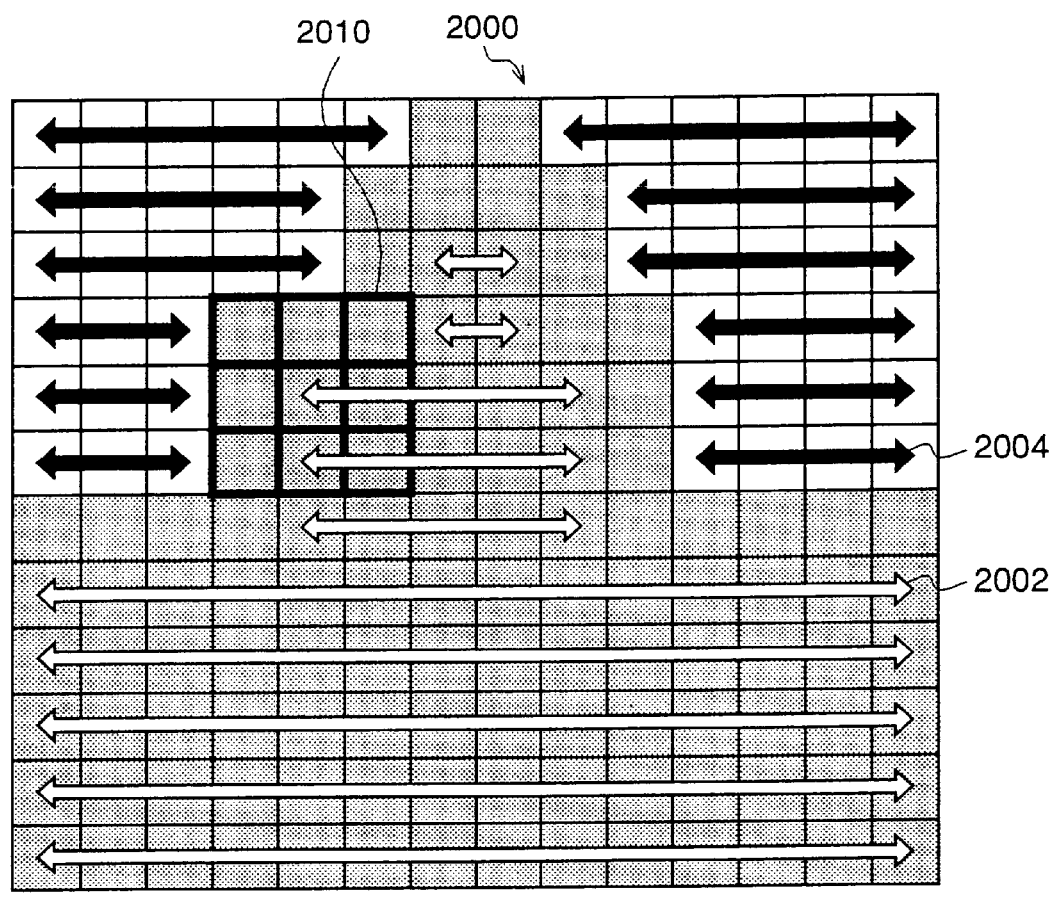

FIGS. 16 and 17 are diagrams for explaining an image composition method according to an eighth embodiment of the present invention. In this eighth embodiment, when performing composition, positions of pixels inside and outside the object are checked in advance, whereby the redundant decision process as to whether composition is performed or not can be reduced.

FIGS. 16 and 17 shows shape images obtained by a shape signal of a predetermined image. In these figures, one block corresponds to one pixel. Colored pixels (for example, 1902) indicate that these pixels are inside the object, and while pixels (for example, 1904) indicate that these pixels are outside the object.

In the image composition method according to any of the first to third embodiments, as described above, the composition ratio and the texture data of a target pixel to be subjected to composition are calculated by using the data of pixels within a target region 1910 having the target pixel in the center.

In FIG. 16, pixels shown by white arrows or pixels adjacent to those pixels shown by white arrows are to be subjected to the process for the shape data of pixels at the boundary of the foreground image and the background image, which process has been described for any of the first to third embodiment.

In FIG. 17, with respect to pixels positioned inside the object without abutting the boundary (pixels shown by white arrows 2002) or pixels positioned outside the object (pixels shown by black arrows 2004), these pixels are not subjected to the above-mentioned process according to any of the first to third embodiments.

In this eighth embodiment, as shown in FIGS. 16 and 17, the shape signal (the shape image 1900 or 2000 obtained from the shape signal) is scanned to retrieve the start point and the end point of a portion (pixels) to be subjected to the above-mentioned process, and the start point and the end point of a portion (pixels) which does not need the above-mentioned process. Then, using the data of pixel positions so obtained, the boundary portion and the other portion are processed separately. Thereby, the redundant processing can be reduced as compared with the case of performing the decision pixel by pixel.

Figure 18:
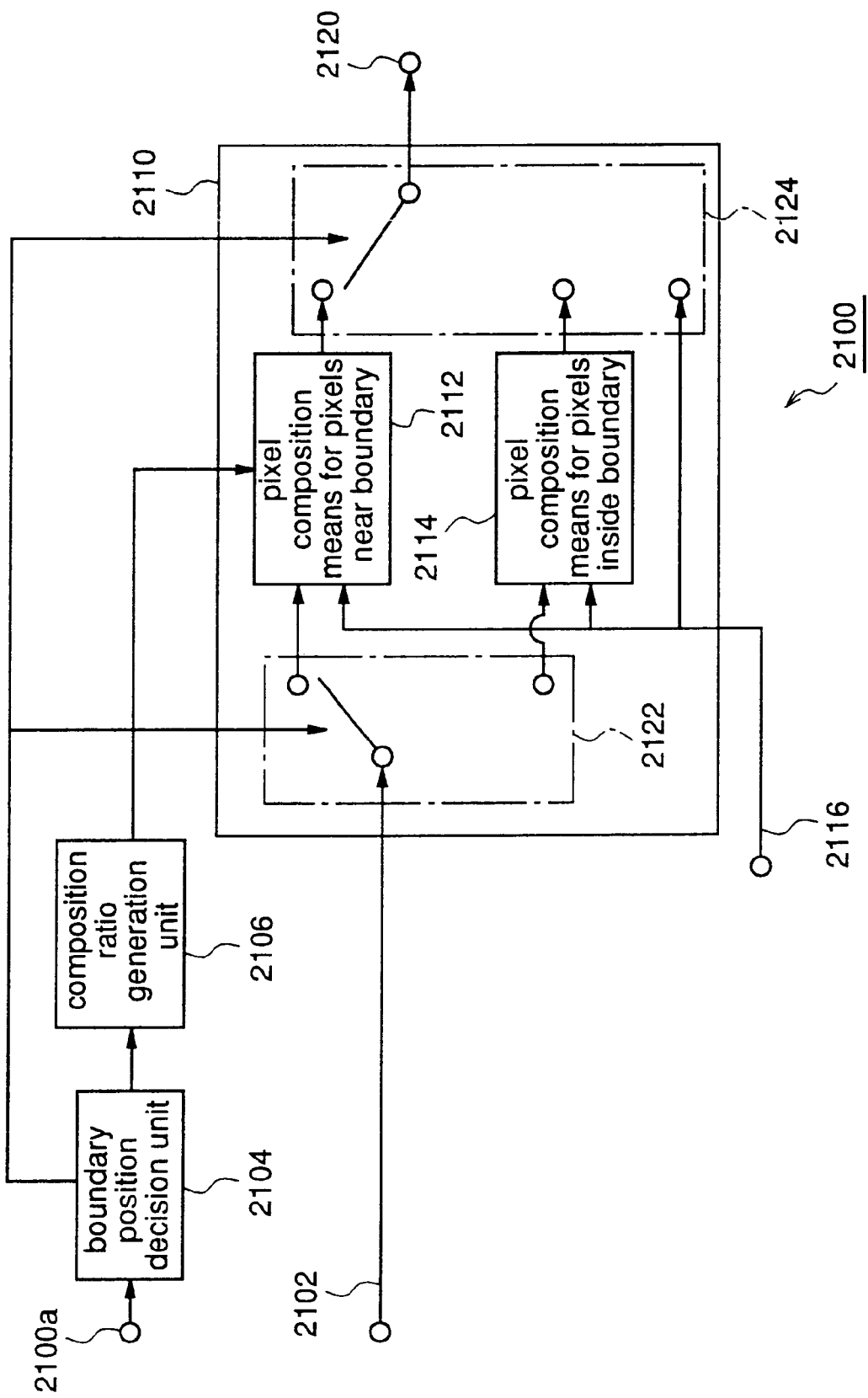
FIG. 18 is a block diagram illustrating an image composition apparatus according to the eighth embodiment.

FIG. 18 is a block diagram illustrating an image composition apparatus 2100 performing the above-described retrieval of the shape signal shown in FIGS. 16 and 17.

The image composition apparatus 2100 includes a boundary position decision unit 2104, and a composition ratio generation unit 2106. The boundary position decision unit 2104 decides the boundary position of the object, based on the shape signal input through the input terminal 2100a. The composition ratio generation unit 2106 calculates the composition ratio of a target pixel to be subjected to composition, based on the result from the boundary position decision unit 2104. Further, the image composition apparatus 2100 includes a composition unit 2110. The composition unit 2110 composites the texture data of the foreground image to be processed (pixel values of the texture signal) which is input through the second input terminal 2102, and the texture data of the background image (pixel values of the texture signal) which is input through the third input terminal 2116, based on the composition ratio calculated by the composition ration generation unit 2106, to obtain the texture data of the composite image.

The composition unit 2110 comprises pixel composition means 2112 and 2114, and switches 2122 and 2124. The pixel composition means 2112 performs composition of pixels positioned in the vicinity of the boundary of the object, and the pixel composition means 2114 performs composition of pixels positioned inside and apart from the boundary of the object. The switch 2122 supplies the texture data of the foreground image to be processed to one of the pixel composition means 2112 and 2114, based on the information of boundary position from the decision means 2108. The switch 2124 selects one from the output of the pixel composition means 2112, the output of the pixel composition means 2114, and the texture data of the background image, based on the information of boundary position.

The apparatus so constructed operates as follows.

Initially, when the shape signal is input to the composition apparatus 2100 through the input terminal 2100a, the boundary of the object is decided by the boundary position decision unit 2140. A pixel, which has been decided as a boundary pixel by the boundary position decision unit 2104, is regard as a target pixel to be subjected to composition, and sent to the composition ratio generation unit 2106, wherein the composition ratio of the pixel is calculated. In the composition unit 2110, texture data of the composite image is obtained by using the texture data of the foreground image to be processed (pixel values of the texture signal) input through the second input terminal 2102, the texture data of the background image (pixel values of the texture signal) input through the third input terminal 2116, and the composition ratios calculated by the composition ratio generation unit 2106.

When performing composition, the composition process is switched between that for the pixels in the vicinity of the boundary by the composition means 2112 and that for the pixels other than those mentioned above by the composition means 2114, by the switches 2122 and 2124, according to the information of the boundary position supplied from the boundary position decision unit 2108.

In this eighth embodiment, since calculation of composition ratio is performed for only the pixels positioned in the vicinity of the boundary, the amount of processing can be significantly reduced.

Although in this eighth embodiment the composition ratio generation unit 2106 is used to calculate the composition ratio, this unit is not always necessary. The pixel composition means 2112 may calculate the composition ratio.

Furthermore, the image composition method according to this eighth embodiment may be combined with the image composition method according to the seventh embodiment. In this case, the retrieval of the shape signal according to this eighth embodiment is perfumed to the target region enclosing the shape of the object, using the additional information indicating the size of the object and the like, whereby the redundant calculation required for deciding whether pixels are inside or outside the object is further reduced.

Embodiment 9

Figure 19:
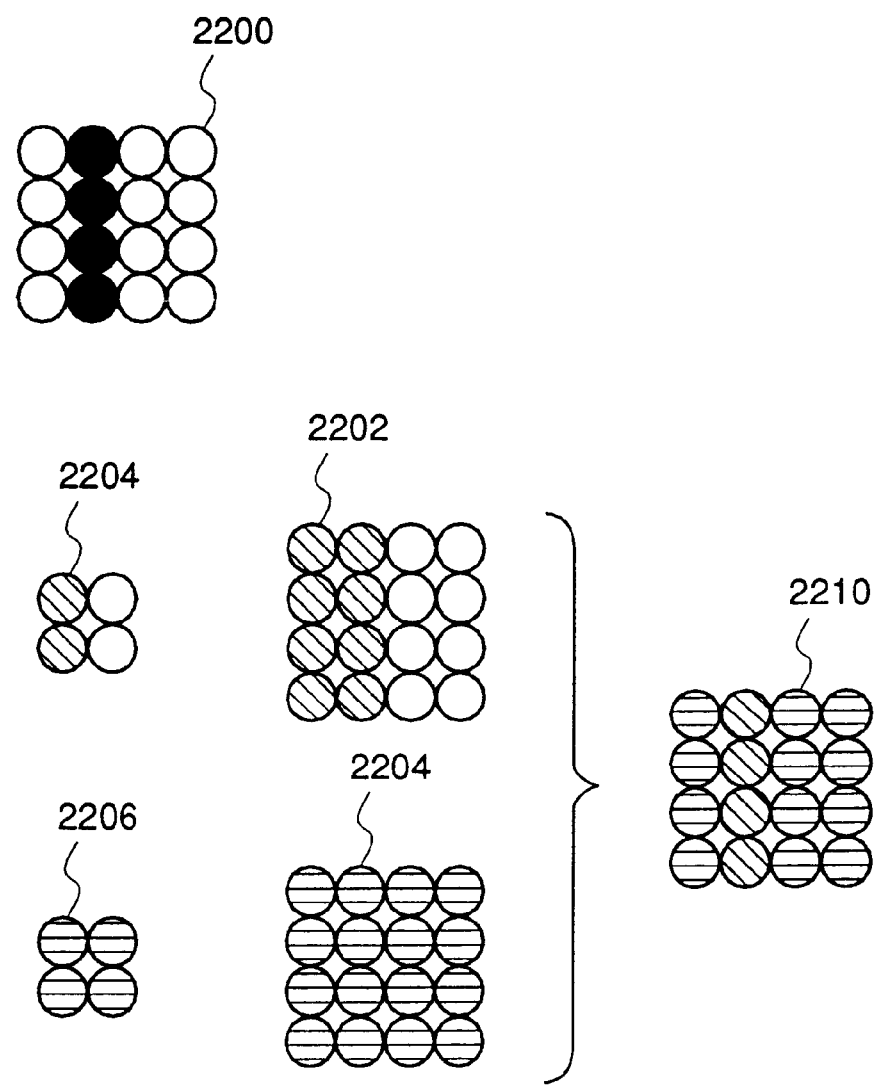
FIGS. 19 and 20 are schematic diagrams for explaining an image composition method according to a ninth embodiment of the present invention.

FIG. 19 is a diagram for explaining an image composition method according to a ninth embodiment of the present invention. In this ninth embodiment, when an image signal of a foreground image, whose texture signal and shape signal have different resolutions, is composited with an image signal of a background image, the texture signal (chrominance signal) is subjected to resolution conversion according to the resolution of the shape signal, and composition of chrominance signals is performed between the foreground image and the background image.

FIG. 19 conceptually illustrates the process of compositing the chrominance signals of the foreground image and the background image after resolution conversion. In FIG. 19, reference numerals 2200, 2204, and 2206 are identical to the shape pixels 2500 of the foreground image shown in FIG. 26, the chrominance pixels 2504 of the foreground image, and the chrominance pixels 2506 of the background image, respectively.

Hereinafter, the image composition method according to the ninth embodiment will be described with reference to FIG. 19.

Initially, with reference to the pixel values (shape data) of the foreground shape pixels 2200, the pixel values (chrominance data) of the corresponding chrominance pixels 2204 are converted to the same size (resolution) as that of the shape data to obtain chrominance pixels 2202. For this resolution conversion, a method standardized by MPEG4 may be employed (refer to 2.2.2. filtering process in MEPG-4 Video Verification Model Ver8.0 (ISO/IEC JTC1/SC29/WG11 N1796)). Likewise, with respect to the pixel values (chrominance data) of the background chrominance pixels, if the size of the chrominance data is different from that of the shape data, 2×2 chrominance pixels 2206 is subjected to resolution conversion to obtain 4×4 chrominance pixels 2204.

Then, the chrominance signals of the foreground image and the background image are composited by using the pixel values of the resolution-converted foreground and background chrominance pixels 2202 and 2204 and the pixel values of the shape pixels 2202, whereby composite chrominance pixels 2210 are obtained.

When the composite chrominance pixels 2210 are compared with the composite chrominance pixels 2510 obtained by the conventional method in which resolution conversion is performed after composition (see FIG. 26), the pixel values of the composite chrominance pixels 2210 have less influence on the pixel values of the pixels outside the object.

Figure 26:
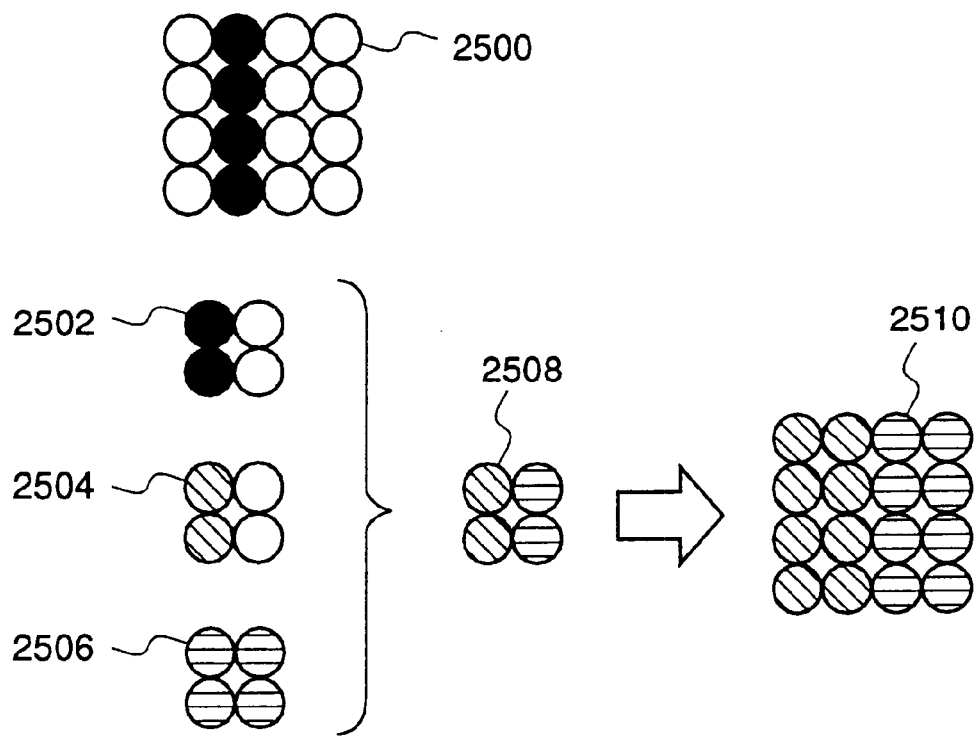
FIG. 26 is a diagram for explaining the process of image composition and resolution conversion, in a conventional image composition method.
Figure 27:
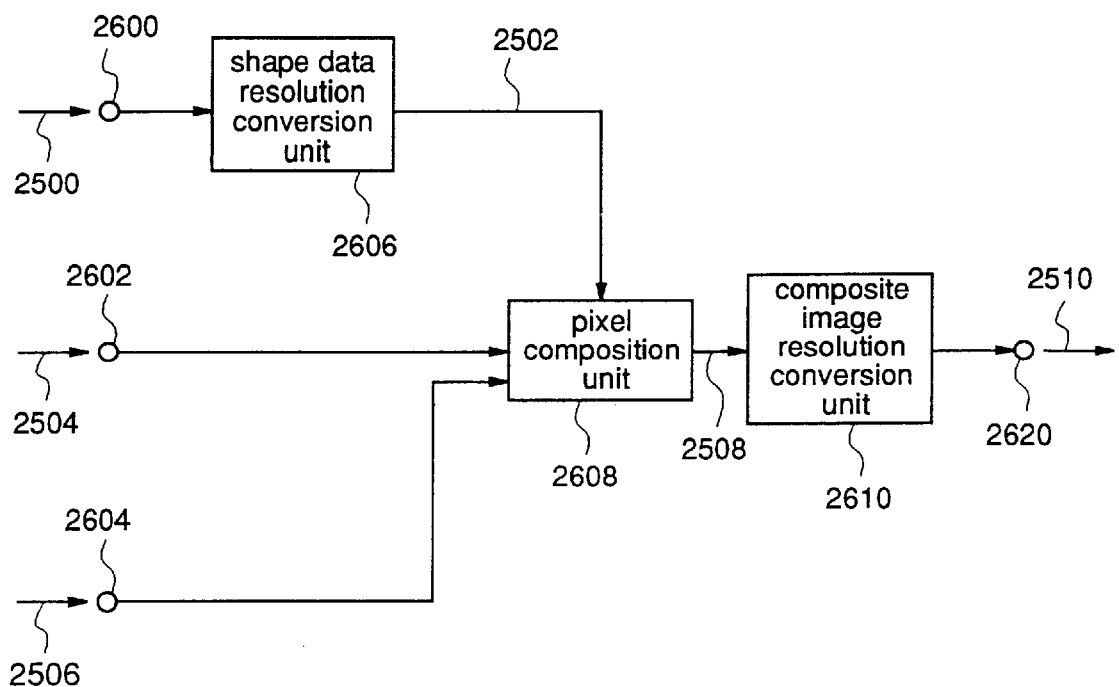
FIG. 27 is a block diagram illustrating an apparatus for the resolution conversion process shown in FIG. 26.

Therefore, degradation of image quality is less in the process shown in FIG. 19 in which the resolution (lower resolution) of the chrominance signal is adjusted to the resolution (higher resolution) of the shape signal and then composition of chrominance signal is performed, than in the process shown in FIG. 26 in which the resolution of the shape signal is once reduced, and composition of chrominance signal is performed by using the shape signal of the reduced resolution and, after the composition, the resolution of the composite chrominance signal is increased.

Figure 20:
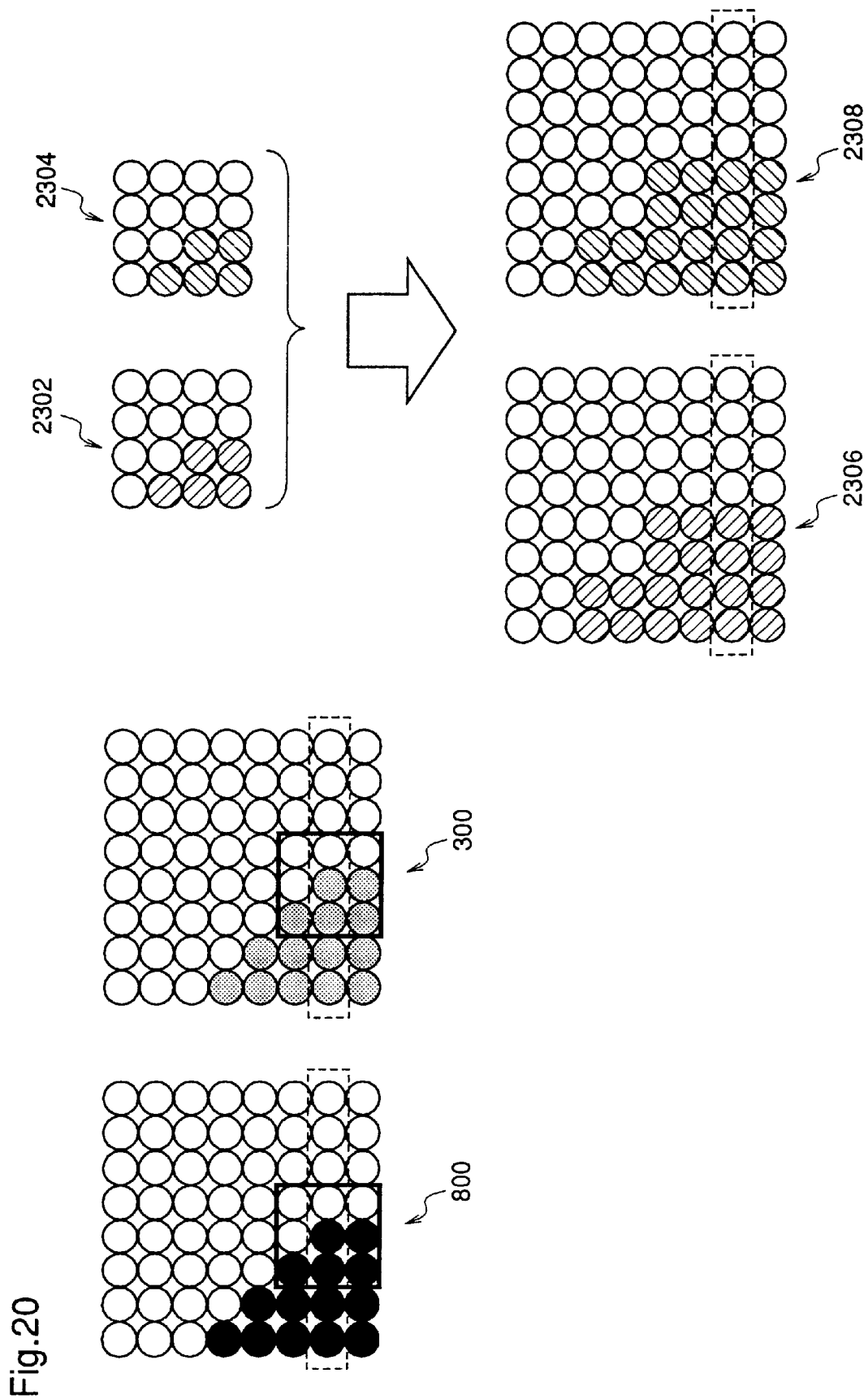

FIG. 20 is a conceptual diagram illustrating, in pixel units, shape data composing a shape signal, and luminance data composing a luminance signal as a texture signal. In FIG. 20, 8×8 shape pixels 800 and 8×8 luminance pixels 300 are identical to the shape pixels 300 shown in FIG. 25 and the texture pixels 800 shown in FIG. 5, respectively.

In FIG. 20, reference numerals 2302 and 2304 denote chrominance pixels each corresponding to the luminance pixels 800. Although the shape pixels 800 are of the same number as the luminance pixels 300, since the number of the chrominance pixels 2302 (2304) is ¼ of the shape pixels 800 or the luminance pixels 300, pixel-to-pixel correspondence cannot be made between the chrominance signal and the luminance signal or the shape signal.

Hence, when compositing the foreground image and the background image, the chrominance signal is subjected to resolution conversion in accordance with the pixel number of the shape signal to obtain 8×8 chrominance pixels 2306 or 2308. For this resolution conversion, the method standardized by MPEG4 may be employed (refer to 2.2.2. filtering process in MEPG-4 Video Verification Model Ver8.0 (ISO/IEC JTC1/SC29/WG11 N1796)). To be specific, interpolation of pixels is performed by subjecting adjacent pixels to weighted averaging.

When pixels positioned outside and adjacent to the boundary of the object are subjected to resolution conversion, since the chrominance data of the pixels outside the object have variable values, the chrominance data of the pixels inside the object are used as the corresponding chrominance data.

Then, the resolution-converted chrominance signals are subjected to composition between the foreground image and the background image is performed, with reference to the corresponding shape data.

In this ninth embodiment, emphasis has been placed on the composition method in which, when the chrominance signal and the shape signal have different resolutions, resolution conversion is performed before composition. However, the texture signal (luminance signal and chrominance signal) and the shape signal may be subjected to resolution conversion to the size adapted to the screen for display, followed by composition of the foreground image and the background image. In this case, for the resolution conversion of the texture signal, the above-mentioned method may be used. For the resolution conversion of the shape signal, a method based on MPEG4 may be employed (refer to 3.2.5 size conversion in MPEG-4 Video Verification Model Ver8.0 (ISO-IEC JTC1/SC29/WG11 N1796)).

Figure 21:
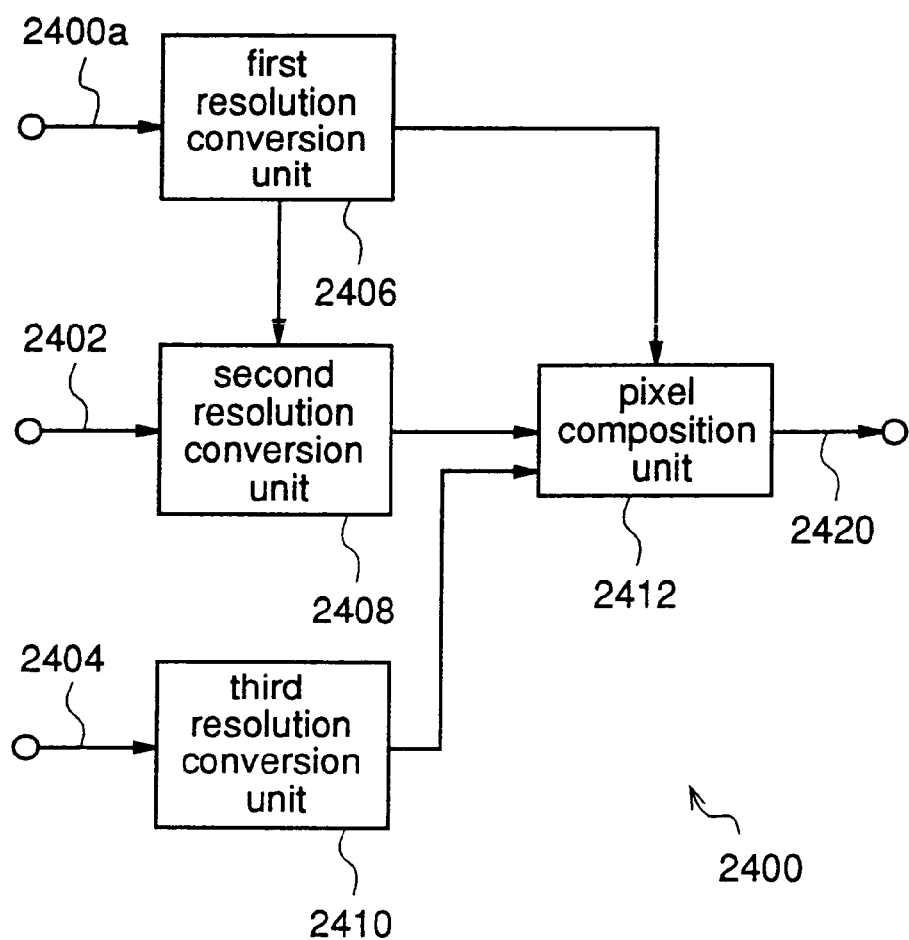
FIG. 21 is a block diagram illustrating an image composition apparatus according to the ninth embodiment.

A description is now given of an image composition apparatus 2400 performing composition after resolution conversion, by using FIG. 21.

The image composition apparatus 2400 includes a first resolution conversion unit (shape data resolution conversion unit) 2406 which subjects the shape signal input through the first input terminal 2400 to resolution conversion according to the size (resolution) of the display screen; a second resolution conversion unit (pixel data resolution conversion unit) 2408 which subjects the texture signal input through the second input terminal 2402 to resolution conversion according to the size (resolution) of the shape signal; and a third resolution conversion unit (pixel data resolution conversion unit) 2410 which subjects the background texture signal input through the third input terminal 2404 to resolution conversion.

Further, the image composition apparatus 2400 includes a pixel composition unit 2412 which receives the outputs of the first to third resolution conversion units 2406, 2408, and 2410, performs composition of texture signals between the foreground image and the background image, and outputs the composite texture signal to the output terminal 2420.

The apparatus so constructed operates as follows.

Initially, a shape signal of a foreground image showing the shape of an object is input to the apparatus 2400 through the first input terminal 2400a, while a texture signal of the foreground image corresponding to the shape signal is input to the apparatus through the second input terminal 2402. Further, a texture signal of a background image is input to the apparatus through the third input terminal 2404.

The shape signal input through the first input terminal 2400 is subjected to resolution conversion according to the size (resolution) of the display screen, by the first resolution conversion unit 2406. The texture signal input through the second input terminal 2402 is subjected to resolution conversion according to the size (resolution) of the shape signal, by the second resolution conversion unit 2408. Further, the background texture signal input through the third input terminal 2404 is subjected to resolution conversion by the third resolution conversion unit 2410.

Thereafter, the outputs of the first, second, and third resolution conversion units 2406, 2408, and 2410 are input to the pixel composition unit 2412, wherein composition of the texture signals is performed between the foreground image and the background image. The composition texture signal is output from the output terminal 2420.

Although in this ninth embodiment resolution conversion is used for scale-up, it may be used for scale down as well. That is, when the size of the display screen in small, the input shape signal and texture signal are scaled down to the image size adapted to the size of the display screen, before composition.

Further, only one of the foreground image and the background image may be scaled up or down as desired before composition. Furthermore, scale-up or scale-down may be performed independently for the luminance signal or the chrominance signal.

In this ninth embodiment, emphasis has been placed on the case where the resolution of the chrominance signal is ¼ of the resolution of the luminance signal, i.e., the resolution of the chrominance signal is ½ of the resolution of the luminance signal in both the horizontal direction and the vertical direction. However, in the image composition method according to this ninth embodiment, the ratio of the resolution of the chrominance signal to that of the luminance signal is not restricted thereto. For example, even when the resolution of the chrominance signal in the horizontal direction is ½ of that of the luminance signal while the resolution of the chrominance signal in the vertical direction is equal to that of the luminance signal, image composition can be performed in similar manner to the ninth embodiment.

Embodiment 10

When an image processing program for performing image composition according to any of the image composition methods of the aforementioned embodiments is recorded in a data storage medium such as a floppy disk, the process according to the embodiment can be easily implemented in an independent computer system.

Figure 22:
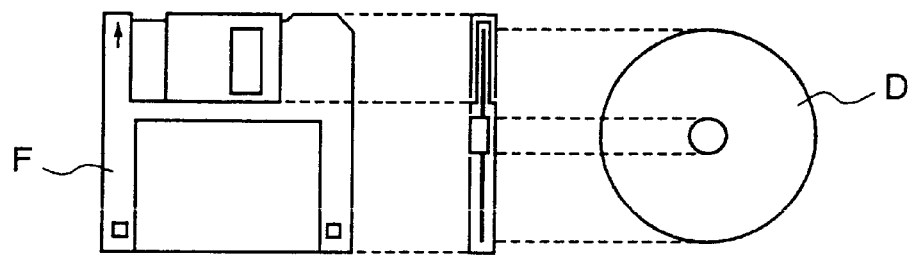
FIGS. 22(a)–22(c) are diagrams for explaining a data storage medium containing a program for implementing image composition according to any of the embodiments of the invention, by a computer system.
Figure 22:
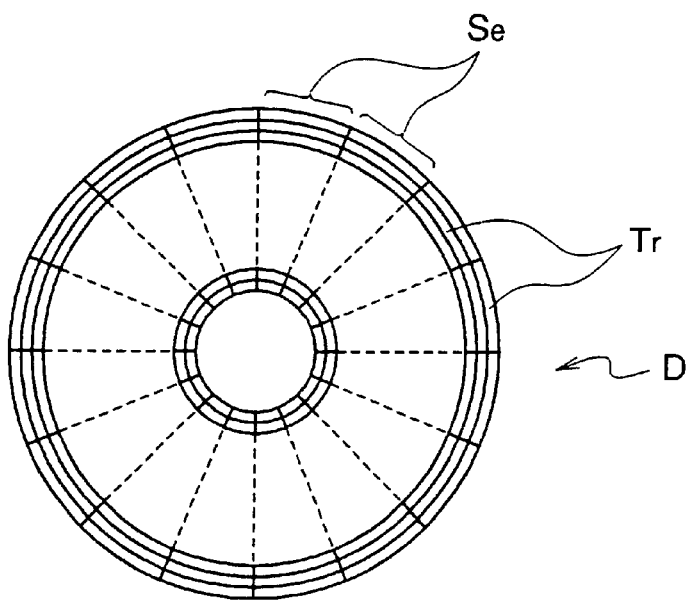
Figure 22:
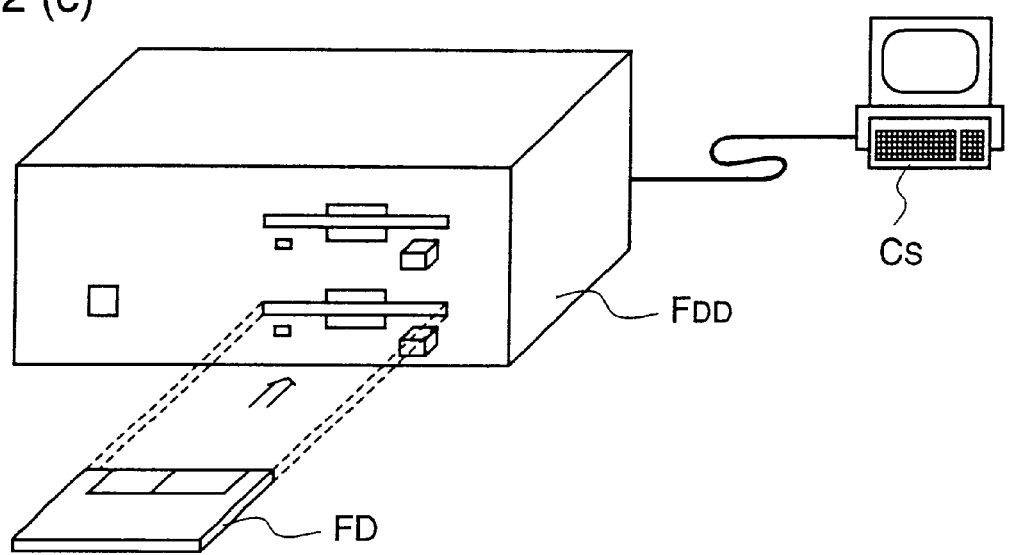

FIGS. 22(a)–22(c) are diagrams for explaining the case where the image composition according to any of the first to ninth embodiments is executed by a computer system, using a floppy disk which contains the image processing program.

FIG. 22(a) shows a front view of a floppy disk, a cross-sectional view thereof, and a floppy disk body. FIG. 22(b) shows an example of a physical format of the floppy disk body D. The floppy disk body D is stored in a case F. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk having the above-mentioned program, data of the program are recorded in the assigned sectors on the floppy disk body D.

FIG. 22(c) illustrates the structure for recording/reproducing the program in/from the floppy disk FD. To be specific, when the program is recorded in the floppy disk FD, data of the program are written in the floppy disk FD from the computer system Cs through the floppy disk drive FDD. When the above-described image composition apparatus is constructed in the computer system Cs by the program recorded in the floppy disk FD, the program is read from the floppy disk FD by the floppy disk drive FDD and then loaded to the computer system Cs.

While in this tenth embodiment a floppy disk is employed as a data storage medium, an optical disk may be employed. Further, the data storage medium is not restricted to these disks. Any medium may be employed as long as it can contain the program, for example, an IC card or ROM cassette.

In the image composition methods according to the aforementioned embodiments, composition is performed after smoothing the shape data or texture data of pixels arranged over the boundary of the object. However, in place of deciding for each pixel as to whether it is positioned at the boundary or not, pixels positioned about the boundary may be detected in advance. In this case, these pixels positioned about the boundary are processed by the composition method of the present invention while the other pixels inside the object are processed by the conventional method, whereby the redundant decision process can be reduced.

Furthermore, since a texture signal is composed of a luminance signal and a chrominance signal, the size of a target region including a target pixel in composition of the luminance signal and the size of a target region including a target pixel in composition for the chrominance signal may be set independently of each other. Or, different composition processes may be used for processing the luminance signal and the chrominance signal, respectively.

While in the aforementioned embodiments composition of luminance data or chrominance data between the foreground image and the background image is performed according to the calculation defined by formula (1), the calculation can be simplified by using a formula which is obtained by transforming formula (1) such that the multiplier or divisor in the calculation becomes a power of 2. That is, by a bit shift process for the multiplicand or dividend in the arithmetic unit, the product or the multiplier and the multiplicand or the quotient obtained by dividing the dividend by the divisor can be easily obtained.

To be specific, formula (1) can be transformed to the following formula (3) when 0<alpha<255.

$$pel=(alpha \times tgpel+(256-alpha) \times bgpel)/256 \qquad (3)$$

wherein, when alpha=0, pel=bgpel, and when alpha=255, pel=fgpel.

Further, formula (1) can be transformed to the following formula (4) when alpha<0.

$$pel=((alpha+1) \times fgpel+(255-alpha) \times bgpel)/256 \qquad (4)$$

wherein, when alpha=0, pel=bgpel.

Further, the formulae for calculating the pixel value pel after composition shown in FIGS. 2(c), 3(c), 7 and 8 can be transformed in similar manner to simplify the calculation.

Embodiment 11

Figure 28:
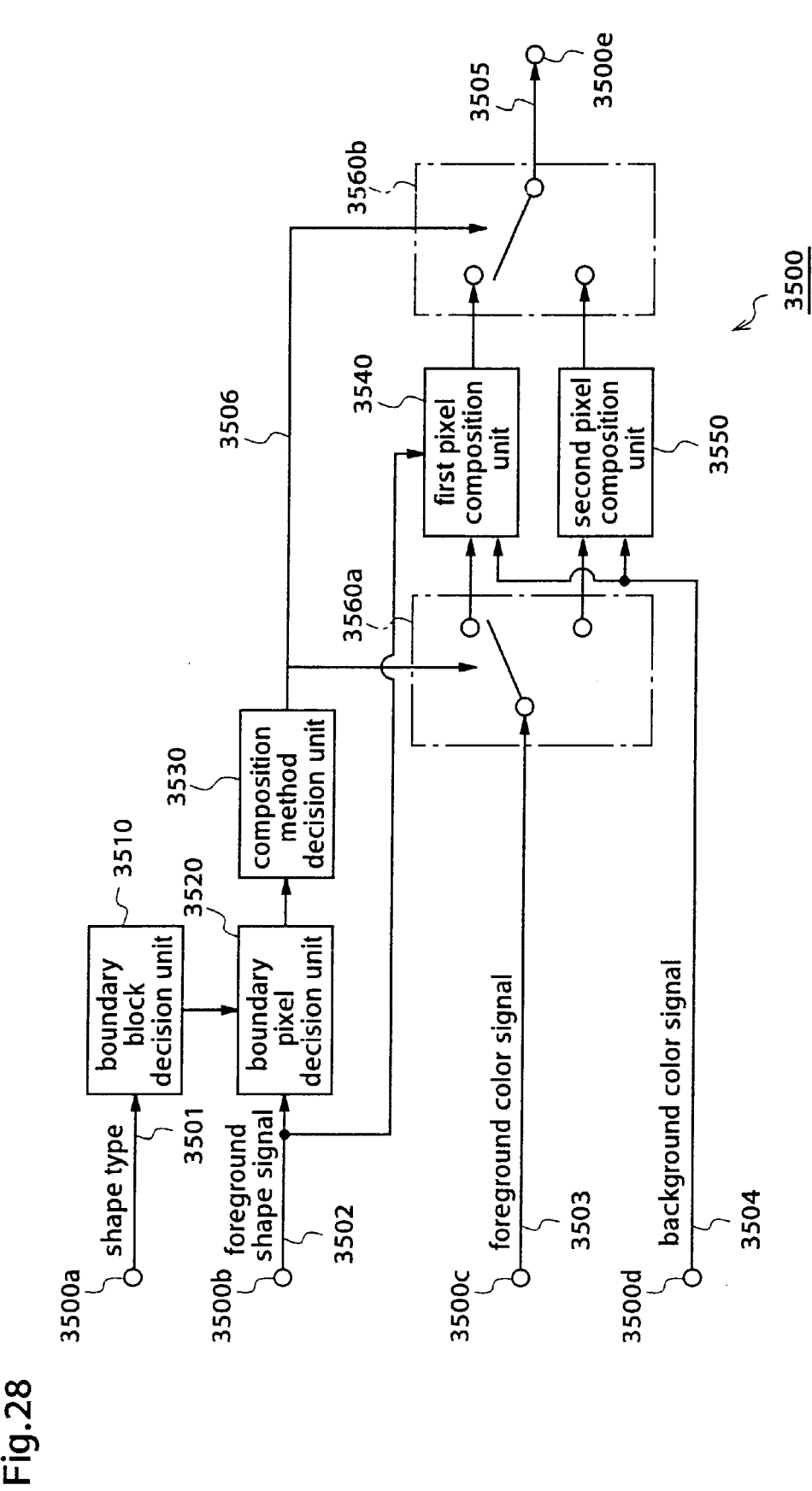
FIG. 28 is a block diagram explaining an image composition method and an image composition apparatus according to an eleventh embodiment of the present invention.

FIG. 28 is a block diagram for explaining an image composition method and an image composition apparatus according to an eleventh embodiment of the present invention.

The image composition method of this eleventh embodiment is a method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space.

In this method, first and second image composition processes according to different composition methods are switched, based on the shape signals of pixels positioned inside a target region including a target pixel in the first image space.

The first image composition process includes a composition ratio calculation step and a pixel composition step, and uses the composite texture signal as the texture signal of a pixel in the third image space corresponding to the target pixel.

In the composition ratio calculation step, the composition ratio of the texture signal of the target pixel is calculated, based on the shape signals of pixels positioned inside the target region including the target pixel. Further, in the pixel composition step, based on the composition ratio so calculated, the texture signals of the target pixel and the corresponding pixel in the second image space are composited.

Further, in the second image composition process, the texture signal of the target pixel inside the object in the first image space is used as the texture signal of a pixel corresponding to the target pixel in the third image space, in the pixel composition step.

FIG. 28 is a block diagram illustrating an image composition apparatus 3500 performing composition according to the image composition method of the eleventh embodiment.

The image composition apparatus 3500 includes a boundary block decision unit 3510. The boundary block decision unit 3510 decides that a predetermined-size region (target region) including a target pixel to be processed corresponds to one of the following three regions: a region all pixels of which are positioned outside the object (hereinafter, referred to as out-object block), a region all pixels of which are positioned inside the object (hereinafter, referred to as in-object block), and a region including both of pixels positioned outside the object and pixels positioned inside the object (hereinafter, referred to as boundary block), according to a shape type signal obtained from a foreground image signal. Here, the shape data of pixels outside the object are "0", and the shape data of pixels inside the object are "255".

Further, the image composition apparatus 3500 includes a boundary pixel decision unit 3520 and a composition method decision unit 3530. The boundary pixel decision unit 3520 receives the foreground shape signal, and decides whether each pixel in the boundary block is inside the object or not, based on the result from the boundary block decision unit 3510. The composition method decision unit 3530 calculates the number of pixels inside the object in the boundary block according to the result from the boundary pixel decision unit 3520, and outputs a composition control signal 3506 according to whether the number of the pixels inside the object is larger than a predetermined threshold or not.

Furthermore, the image composition apparatus 3500 includes first and second pixel composition units 3540 and 3550 performing composition of texture signals (color signals) of the background image and the foreground image.

The first pixel composition unit 3540 implements the composition process according to the image composition method of the first embodiment.

To be specific, the first pixel composition unit 3540 comprises a composition ratio calculation means which calculates the composition ratio of the texture signal of the foreground target pixel according to the foreground shape signal, and a pixel composition means which performs composition of texture signals of the foreground target pixel and the corresponding background pixel according to the calculated composition ratio. The first pixel composition unit 3540 outputs the composite texture signal as the texture signal of a pixel corresponding to the target pixel in the composite image.

On the other hand, the second pixel composition unit 3550 uses the texture signal of the target pixel inside the object of the foreground image as the texture signal of a pixel corresponding to the target pixel in the composite image, and uses the texture signal of a pixel in the background image and corresponding to the target pixel outside the object of the foreground image, as the texture signal of a pixel in the composite image and corresponding to the target pixel.

More over, the image composition apparatus 3500 a pre-stage switch 3560a and a post-stage switch 3560b. The switch 3560a supplies the foreground color signal to one of the first and second pixel composition units 3540 and 3550, according to the composition control signal 3506 from the composition method decision unit 3530. The switch 3560b selects one of the output signals from the first and second pixel composition units 3540 and 3550 according to the composition control signal 3506 from the composition method decision unit 3530, and outputs the selected signal to the output terminal 3500e as the color signal of the composite image.

In FIG. 28, reference numerals 3500a–3500d denote first to fourth input terminals. The first input terminal 3500a receive the shape type signal, the second input terminal 3500b receives the foreground shape signal, the third input terminal 3500c receives the foreground color signal, and the fourth input terminal 3500d receives the background color signal.

The apparatus so constructed operates as follows.

When the shape type signal obtained from the foreground image signal is input to the image composition apparatus 3500 through the first input terminal 3500a, the boundary block decision unit 3510 decides that a region of a predetermined size including a target pixel to be processed (in this case, a block of 3×3 pixels) corresponds to one of the following three regions: a region all pixels of which are positioned outside the object (out object block), a region all pixels of which are positioned inside the object (in-object block), and a region including both of pixels positioned outside the object and pixels positioned inside the object (boundary block).

Further, the boundary pixel decision unit 3520 receives the foreground shape signal applied to the second input terminal 3500b, and decides whether each pixel in the boundary block is inside the object or not, according to the result from the boundary block decision unit 3510.

Then, the composition method decision unit 3530 calculates the number of pixels inside the object in the boundary block according to the result from the boundary pixel decision unit 3520, and outputs the composition control signal 3506 according to whether the number of pixels inside the object is larger than a predetermined threshold or not.

At this time, the pre-stage switch 3560a is controlled by the composition control signal 3506 to supply the foreground color signal applied to the third input terminal 3500c to one of the first and second pixel composition units 3540 and 3550, while the post-stage switch 3560b is controlled by the composition control signal 3506 to select one of the outputs from the first and second pixel composition units 3540 and 3550.

For example, when the result of the decision by the composition method decision unit 3530 is that the number of the pixels inside the object in the boundary block is larger than the threshold, the foreground color signal 3503 is supplied to the first pixel composition unit 3540 through the switch 3560a, and the output of the pixel composition unit 3540 is output to the output terminal 3500e through the switch 3560b, as the composite color signal 3505. In the first pixel composition unit 3540, the composition ratio of the texture signal of the foreground target pixel is calculated according to the foreground shape signal. Then, the texture signals of the foreground target pixel and the corresponding background pixel are composited according to the composition ratio calculated.

On the other hand, when the result of the decision by the composition method decision unit 3530 is that the number of pixels inside the object in the boundary block is not larger than the threshold, the foreground color signal 3503 is supplied to the second pixel composition unit 3550 through the switch 3560*a*, and the output of the pixel composition unit 3550 is output to the output terminal 3500*e* through the switch 3560*b*, as the composite color signal 3505. In the second pixel composition unit 3550, the texture signal of the target pixel in the object of the foreground image is output as the texture signal of the corresponding pixel in the composite image, while the texture signal or a pixel in the background image, which pixel corresponds to the target pixel outside the object of the foreground image, is output as the texture signal of the corresponding pixel in the composite image.

As described above, according to the eleventh embodiment of the present invention, since the above-described first and second composition processes are switched according to the foreground shape signal, the boundary of the foreground image and the background image is prevented from appearing unnatural on the display and, further, the boundary is prevented from blurring.

While in this eleventh embodiment the first pixel composition unit performs the composition process according to the image composition method of the first embodiment, the first pixel composition unit may perform another composition process according to the image composition method described for any of the second to eighth embodiments.

Moreover, when an image composition program for implementing the composition process by the image composition method according to the eleventh embodiment is recorded in a data storage medium such as a floppy disk, the composition process of the eleventh embodiment can be easily executed in an independent computer system.

What is claimed is:

1. An image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, said method comprising:

composition ratio calculation step of calculating the composition ratio of the texture signal of a target pixel to be processed, by arithmetic on the shape signals of pixels positioned inside a target region in the first image space, said target region including the target pixel; and pixel composition step of performing composition of the texture signals between the target pixel and a pixel included in the second image space and corresponding to the target pixel, based on the composition ratio calculated;

wherein a composite texture signal obtained by the composition is used as the texture signal of a pixel included in the third image space and corresponding to the target pixel.

2. The image composition method of claim 1 further comprising:

shape decision step of deciding, based on the shape signal of each pixel in the first image space, as to whether each pixel is positioned inside the object or not; and said composition ratio calculation step wherein, when the result of the decision is that the target pixel is positioned inside the object, the composition ratio is calculated using the shape signals of the pixels in the target region.

3. The image composition method of claim 1 further comprising:

shape decision step of deciding, based on the shape signal of each pixel in the first image space, as to whether each pixel is positioned inside the object or not; and said composition ratio calculation step wherein, when the result of the decision is that the target pixel is positioned inside the object, the composition ratio is obtained by calculating the average of the shape signals of the pixels in the target region.

4. The image composition method of claim 1 wherein, in said composition ratio calculation step, the composition ratio is calculated based on an arithmetic expression which is obtained by transforming the arithmetic on the shape signal such that the multiplier or divisor in the arithmetic becomes a power of 2.

5. An image composition method for compositing a first image signal which forms a first image space including an object of an arbitrary shape and includes a shape signal indicating the shape of the object and a texture signal indicating the texture of the object, and a second image signal which forms a second image space and includes a texture signal indicating the texture of the image, thereby generating a composite image signal which forms a third image space, said method comprising:

shape decision step of deciding whether each pixel is positioned inside the object or not, based on the shape signal of each pixel in the first image space;

composition ratio calculation step of calculating the composition ratio of the texture signal of the target pixel, based on the number of pixels positioned inside the object in a target region including the target pixel, when the result of the decision is that the target pixel is positioned inside the object; and pixel composition step of performing composition of the texture signals of the target pixel and a pixel included in the second image space and corresponding to the target pixel, based on the composition ratio calculated;

wherein a composite texture signal obtained by the composition is used as the texture signal of a pixel included in the third image space and corresponding to the target pixel.

6. The image composition method of claim 5 wherein, in said composition ratio calculation step, a composition ratio which has previously been calculated according to the number of pixels positioned inside the object in the target region and stored in a table, is obtained from the table, according to the number of pixels inside the object, which number is obtained from the shape signals of pixels positioned inside the target region.

7. The image composition method of claim 1 wherein, in said pixel composition step, the texture signal of the pixel included in the third image space and corresponding to the target pixel is obtained by referring to a table containing the results of multiplication on all the combinations between the values of the composition ratios and the values of the texture signals.

8. The image composition method of claim 5 wherein, in said pixel composition step, the texture signal of the pixel included in the third image space and corresponding to the target pixel is obtained by referring to a table containing the results of multiplication on all the combinations between the numbers of pixels positioned inside the object in the target region and the values of the texture signals.

9. A data storage medium containing a program for making a computer perform an image composition process, said program being constructed so that the computer performs an image composition process according to any of image composition methods as defined in claim 1.

* * * * *

UNITED STATES PATENT AND TRADEMARK OFFICE
CERTIFICATE OF CORRECTION

PATENT NO. : 6,483,521 B1
DATED : November 19, 2002
INVENTOR(S) : Jun Takahashi, Choong Seng Boon and Shinya Kadono It is certified that error appears in the above-identified patent and that said Letters Patent is hereby corrected as shown below:

<u>Column 33,</u>
Line 1, change "compositing" to -- composing --.

Signed and Sealed this

Eighth Day of April, 2003

JAMES E. ROGAN
*Director of the United States Patent and Trademark Office*